(12) United States Patent
Tabe

(10) Patent No.: US 12,440,090 B2
(45) Date of Patent: Oct. 14, 2025

(54) ENDOSCOPE AND ENDOSCOPE SYSTEM

(71) Applicant: FUJIFILM Corporation, Tokyo (JP)

(72) Inventor: Hiroaki Tabe, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 397 days.

(21) Appl. No.: 17/936,693

(22) Filed: Sep. 29, 2022

(65) Prior Publication Data

US 2023/0103104 A1    Mar. 30, 2023

(30) Foreign Application Priority Data

Sep. 30, 2021    (JP) ................................ 2021-161645

(51) Int. Cl.
*A61B 1/00* (2006.01)
*A61B 1/06* (2006.01)
*G02B 23/24* (2006.01)

(52) U.S. Cl.
CPC ...... *A61B 1/00126* (2013.01); *A61B 1/00135* (2013.01); *A61B 1/0017* (2013.01); *A61B 1/0638* (2013.01); *G02B 23/2423* (2013.01); *G02B 23/2469* (2013.01); *G02B 23/2476* (2013.01)

(58) Field of Classification Search
CPC .. A61B 1/06; A61B 1/07; A61B 1/063; A61B 1/0638; A61B 1/0646; A61B 1/0653; A61B 1/00126; A61B 1/00135; A61B 1/0017; A61B 1/00142; G02B 23/2469; G02B 23/2423; G02B 23/2476; G02B 6/0008; G02B 6/3624

See application file for complete search history.

(56) References Cited

U.S. PATENT DOCUMENTS

| 2006/0152926 A1 | 7/2006 | Hama et al. |
| 2008/0089089 A1 | 4/2008 | Hama et al. |
| 2008/0205477 A1* | 8/2008 | Hama ................. A61B 1/0638 |
| | | 359/332 |

(Continued)

FOREIGN PATENT DOCUMENTS

| CN | 101027520 A | 8/2007 |
| CN | 102793525 A | 11/2012 |

(Continued)

OTHER PUBLICATIONS

An Office Action mailed by China National Intellectual Property Administration on Aug. 15, 2025, which corresponds to Chinese Patent Application No. 202211205307.6 and is related to U.S. Appl. No. 17/936,693; with English language translation.

*Primary Examiner* — Michael J Carey
*Assistant Examiner* — Olivia Grace Starkey
(74) *Attorney, Agent, or Firm* — Studebaker Brackett PLLC

(57) ABSTRACT

An endoscope includes an insertion unit, an operation unit, an emission end, a first light guide and a second light guide that guide illumination light emitted from a light source unit to the emission end, a lens member that suppresses a variation in a relative intensity of each color light of the illumination light, and a connection unit that optically connects the first light guide, the second light guide, and the lens member; and the lens member is disposed between the first light guide and the second light guide, and the connection unit and the lens member are provided in the operation unit.

10 Claims, 15 Drawing Sheets

(56) References Cited

U.S. PATENT DOCUMENTS

| | | | |
|---|---|---|---|
| 2014/0022810 A1 | 1/2014 | Ito et al. | |
| 2014/0142385 A1* | 5/2014 | Dahmen | A61B 1/0052 600/173 |
| 2016/0089001 A1 | 3/2016 | Hara et al. | |
| 2017/0035275 A1* | 2/2017 | Yajima | G02B 6/3843 |
| 2017/0264078 A1* | 9/2017 | Daidoji | A61B 1/06 |
| 2017/0367568 A1 | 12/2017 | Noguchi | |
| 2021/0141208 A1 | 5/2021 | Hanano | |

FOREIGN PATENT DOCUMENTS

| | | |
|---|---|---|
| CN | 103443535 A | 12/2013 |
| CN | 106998998 A | 8/2017 |
| CN | 112292061 A | 1/2021 |
| JP | H06-296584 A | 10/1994 |
| JP | H09-304693 A | 11/1997 |
| JP | 2016-067534 A | 5/2016 |
| WO | 2014/109333 A1 | 7/2014 |

* cited by examiner

ENDOSCOPE AND ENDOSCOPE SYSTEM

CROSS-REFERENCE TO RELATED APPLICATIONS

This application claims priority under 35 U.S.C § 119(a) to Japanese Patent Application No. 2021-161645 filed on 30 Sep. 2021. The above application is hereby expressly incorporated by reference, in its entirety, into the present application.

BACKGROUND OF THE INVENTION

1. Field of the Invention

The present invention relates to an endoscope and an endoscope system.

2. Description of the Related Art

Endoscopes are widely used in the medical field and the industrial field. An endoscope includes an insertion unit to be inserted into an object to be examined, and irradiates an object to be observed with illumination light from a distal end portion of the insertion unit. A light guide part for guiding illumination light, which is supplied from a light source device, to the distal end portion of the insertion unit is provided in the endoscope. The light guide part guides illumination light, and the object to be observed is illuminated with the illumination light, so that the inside of the object to be examined can be observed.

In a case where a light guide formed of one optical fiber bundle is used, ease of assembly is poor, and it is difficult to satisfy optical performance. Accordingly, it is known that a light guide part is formed of a plurality of light guides having different characteristics and of an optical member. In an endoscope disclosed in JP1994-296584A (JP-H06-296584A), a light guide part comprises a plurality of light guides. The light guide is formed of, for example, a fiber bundle in which quartz fibers or multi-component fibers are bundled. Since light transmittance and a light distribution width of the optical performance of a fiber bundle are in a trade-off relationship, it is difficult to manufacture a fiber bundle that satisfies both light transmittance and a light distribution width. Accordingly, in the endoscope disclosed in JP1994-296584A (JP-H06-296584A), a lens as an optical member is disposed between the plurality of light guides. In a case where this lens is used, a reduction in the amount of light and deterioration in the distribution of light are prevented, and light emitted from an end portion of a light source-side light guide is transmitted to an end portion of a distal end portion-side light guide.

However, there is an endoscope in which a bendable part is provided at the distal end of an insertion unit to allow a user to observe a portion to be observed at various angles or to easily insert the insertion unit.

In the endoscope disclosed in JP1994-296584A (JP-H06-296584A), the end portions of the light guides and the lens are disposed in a bendable part.

SUMMARY OF THE INVENTION

However, since the end portions of the light guides and the lens are disposed in the bendable part in the endoscope disclosed in JP1994-296584A (JP-H06-296584A), there is a possibility that an optical axis is shifted. That is, in a case where the bendable part is bent, the central axes of the end portions of the light source-side light guide and the distal end portion-side light guide facing the lens do not coincide with the central axis of the lens for preventing a reduction in the amount of light and deterioration in the distribution of light. For this reason, there is a high probability that deterioration in performance, such as a reduction in the amount of light and deterioration in the distribution of light, will occur. Further, one light guide is lengthened in this case. In a case where the light guide is long, the ease of assembly of the endoscope deteriorates.

Further, a structure in which the end portions of the light guides and the lens are disposed in a connector used to connect the endoscope to the light source device is conceivable. However, since the light guides are disposed from the distal end portion of the endoscope to the inside of the connector in this case, the light guides are lengthened. For this reason, an ease of assembly deteriorates as in the endoscope disclosed in JP1994-296584A (JP-H06-296584A).

An object of the present invention is to provide an endoscope and an endoscope system which can prevent a reduction in the amount of illumination light and deterioration in the distribution of the illumination light and of which ease of assembly is improved.

An endoscope according to an aspect of the present invention is an endoscope that is connected to a light source device emitting illumination light in which a plurality of color lights are mixed by a plurality of light sources emitting color lights different from each other. The endoscope comprises an insertion unit, an operation unit, an illumination light-emission end, a light guide part that guides the illumination light, and a connection unit; and the optical member is disposed between the plurality of light guides, and the connection unit and the optical member are provided in the operation unit. The insertion unit is inserted into an object to be examined. The operation unit is connected to the insertion unit. The illumination light-emission end is provided at a distal end portion of the insertion unit. The light guide part includes a plurality of light guides that guide the illumination light emitted from the light sources to the illumination light-emission end, and an optical member that suppresses a variation in a relative intensity of each color light of the illumination light, which is guided by the light guides and is emitted from the illumination light-emission end, with respect to a light distribution angle. The connection unit optically connects the light guides by holding the plurality of light guides and the optical member.

It is preferable that the insertion unit includes a protection sheath and a shaft member inserted into the protection sheath, the operation unit includes an operation unit body connected to a proximal end side of the shaft member, the connection unit is fixed to the protection sheath, and portions of the plurality of light guides held by the connection unit are rotationally moved in a direction around an axis of the insertion unit together with the protection sheath.

It is preferable that the insertion unit includes an outer pipe forming an outer peripheral wall, the protection sheath is inserted into the outer pipe, and the light guides are inserted between the outer pipe and the protection sheath. It is preferable that the operation unit includes a rotational moving operation member supported by the operation unit body to be rotationally movable and that the protection sheath and the light guides are rotationally moved in a same direction as the rotational moving operation member as the rotational moving operation member is rotationally moved.

It is preferable that the endoscope further comprises a signal cable that transmits and receives a signal, the signal cable is inserted into the shaft member, and the light guides are rotationally moved at positions outside the signal cable in a radial direction in a case where the light guides are rotationally moved together with the protection sheath.

It is preferable that the endoscope further comprises a holding member that holds the light guides, the optical member, and the connection unit and that is fixed to the protection sheath; and it is preferable that the holding member is formed in a tubular shape and that the light guides, the optical member, and the connection unit are held on an outer peripheral surface side of the holding member. It is preferable that the connection unit and the holding member are disposed in the operation unit body.

It is preferable that the endoscope further comprises a housing provided in the operation unit and connected to the protection sheath and a connecting unit magnetically connecting the shaft member to the operation unit body, the protection sheath and the housing form an air-tight space, the housing includes a partition wall closing a proximal end side thereof, and the connecting unit magnetically connects the shaft member to the operation unit body with the partition wall interposed therebetween.

It is preferable that the optical member is a lens member that, in a case where a relative intensity of one color light among the plurality of color lights emitted from the light sources is used as a reference, makes relative intensities of the other color lights have a difference of ±5% or less from the relative intensity of the color light used as the reference.

An endoscope system according to another aspect of the present invention comprises the endoscope, and a light source device that emits illumination light in which a plurality of color lights are mixed by a plurality of light sources emitting color lights different from each other.

According to the present invention, it is possible to prevent a reduction in the amount of illumination light and deterioration in the distribution of the illumination light and to improve ease of assembly.

DESCRIPTION OF THE PREFERRED EMBODIMENTS

Schematic Configuration of Endoscope System

Figure 1:
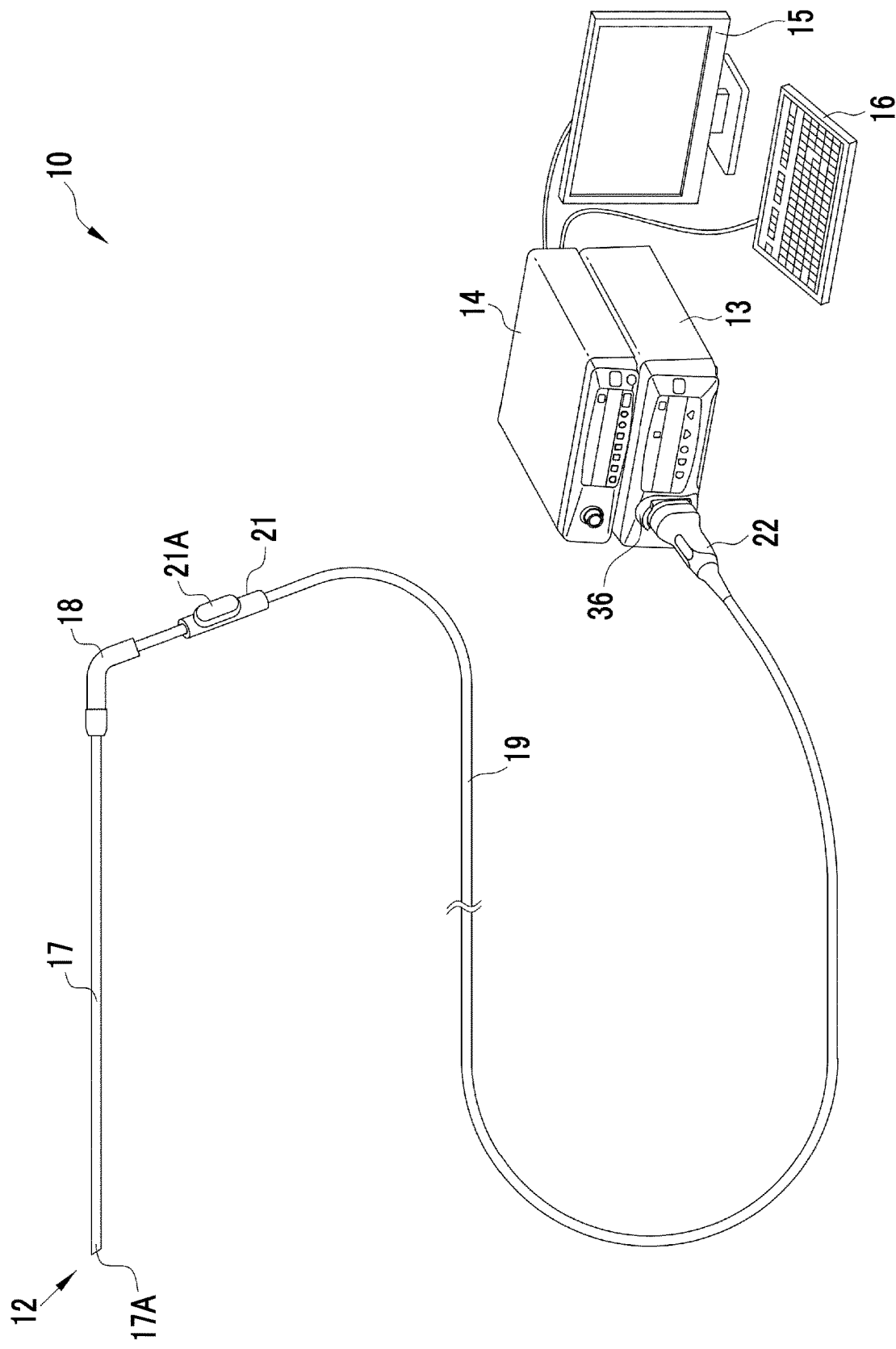
FIG. 1 is an external view of an endoscope system.

As shown in FIG. 1, an endoscope system 10 includes an endoscope 12, a light source device 13, a processor device 14, a monitor 15, and a user interface 16. The endoscope 12 is, for example, a rigid endoscope, such as a laparoscope.

Figure 2:
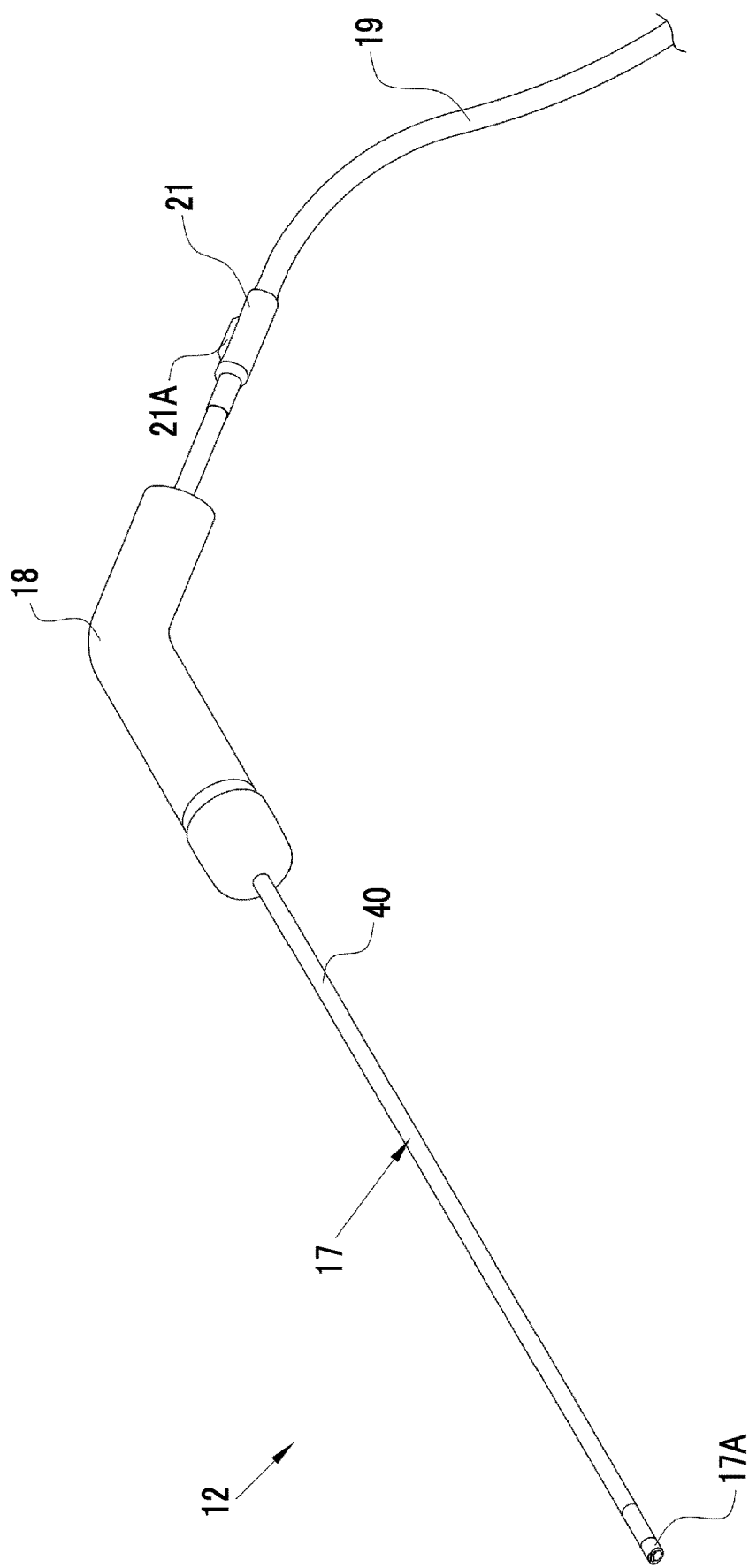
FIG. 2 is an external perspective view of an endoscope.

As shown in FIG. 2, the endoscope 12 comprises an elongated rigid insertion unit 17 that is to be inserted into an object to be examined, an L-shaped operation unit 18 that is connected to a proximal end portion of the insertion unit 17, a soft universal cable 19 that is connected to the insertion unit 17 via the operation unit 18, a switch-disposition member 21 that is provided in a middle portion of the universal cable 19, and an endoscope-side connector 22.

The endoscope 12 is an oblique-viewing endoscope of which a visual field direction (see an optical axis OA of FIG. 5) of an image pickup unit 25 (see FIGS. 3 and 5) to be described later is inclined with respect to an insertion axis Ax of the insertion unit 17. The image pickup unit 25 comprises an image pickup sensor 26 to be described later (see FIGS. 3 and 5).

Figure 3:
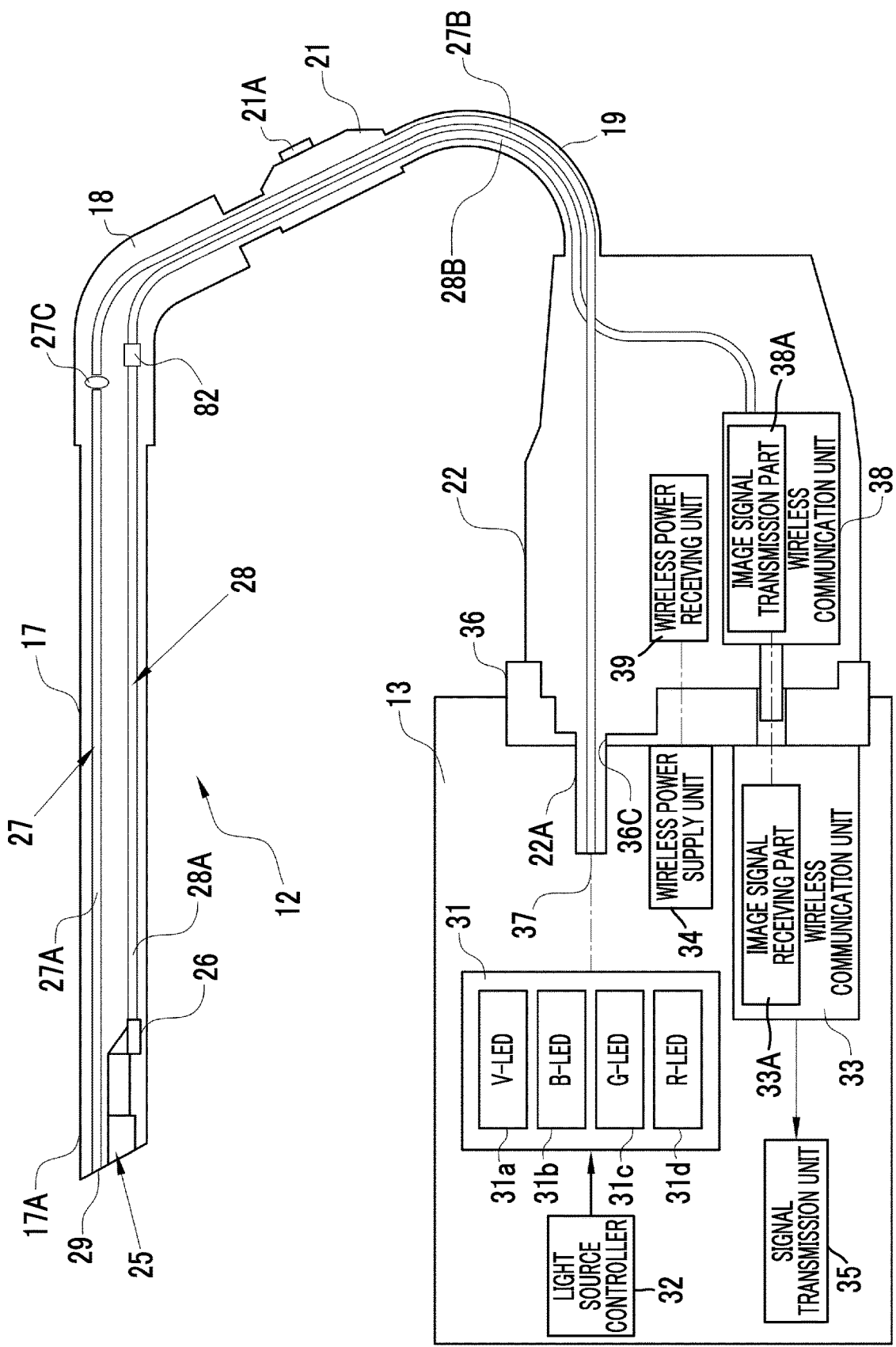
FIG. 3 is a block diagram showing the schematic configuration of the endoscope system.

As shown in FIG. 3, a first light guide 27A and a first signal cable 28A are inserted into the insertion unit 17. The first light guide 27A forms a light guide 27, which guides illumination light emitted from the light source device 13, together with a lens member 27C and a second light guide 27B. The first signal cable 28A forms a signal cable 28 together with an air-tight connector 82 (see FIG. 8) and a second signal cable 28B to be described later. The signal cable 28 includes a control line that transmits control signals used to control the image pickup sensor 26, a signal line that transmits image signals output from the image pickup sensor 26 in a case where the image of an object to be observed irradiated with illumination light is picked up, a power line that supplies power to each part, such as the image pickup sensor 26, and the like. Since the configuration of the light guide 27 and the signal cable 28 will be described in detail later, the description thereof is omitted here.

The endoscope-side connector 22 is provided at a proximal end portion of the universal cable 19. The endoscope 12 is attachably and detachably connected to a light source device-side connector 36 of the light source device 13 via the endoscope-side connector 22. The universal cable 19 is a cable in which the second light guide 27B and the second signal cable 28B are integrated with each other.

The endoscope system 10 according to this embodiment has a configuration in which power, optical signals, and the like are transmitted between the endoscope 12 and the light source device 13 via the endoscope-side connector 22 and the light source device-side connector 36 in a contactless manner.

Further, for example, an image selector switch, which is used to switch an image displayed on the monitor 15 to a normal picked-up image and to a special light image (for example, a white light (WL) image, a blue laser imaging (BLI) image, a linked color imaging (LCI) image, or a low-oxygen imaging image), can be applied as an operation switch 21A disposed on the above-mentioned switch-disposition member 21. Furthermore, the operation switch is not limited thereto, and an image stop switch, an image pickup switch, a zoom switch comprising a telephoto button and a wide button, a washing switch for a distal end portion of the insertion unit, a light amount-adjustment switch, a sensitivity-adjustment switch, or the like can also be applied.

The light source device 13 supplies illumination light to the second light guide 27B (see FIG. 3). Accordingly, illumination light is emitted from an illumination light-emission end (hereinafter, simply referred to as an emission end) 29 of a distal end portion of the light guide 27.

Schematic Configuration of Processor Device

The processor device 14 controls the amount and emission time of illumination light that is emitted from the light source device 13, the operation of the image pickup sensor 26, and the like, and generates an endoscopic image using image signals that are obtained from the image pickup of the object to be observed irradiated with illumination light. Further, the processor device 14 is electrically connected to the monitor 15 and to the user interface 16. The monitor 15 displays the endoscopic image generated by the processor device 14, information about the endoscopic image, and the like. The user interface 16 receives an input operation, such as function settings.

Schematic Configuration of Light Source Device

As shown in FIG. 3, the light source device 13 comprises a light source unit 31, a light source controller 32, a wireless communication unit 33, a wireless power supply unit 34, and a signal transmission unit 35. The light source unit 31 emits illumination light that is used to illuminate the object to be observed. The light source controller 32 controls the light source unit 31. The signal transmission unit 35 transmits control signals, image signals, and the like between the light source device 13 and the processor device 14.

The light source unit 31 includes semiconductor light sources, such as a plurality of color light emitting diodes (LEDs). The light source controller 32 adjusts the turning on or off of the LEDs or the drive currents or drive voltages of the LEDs to control the amounts of illumination light to be emitted. The semiconductor light sources of the light source unit 31 are not limited to LEDs and may be laser diodes (LDs) or the like.

The light source unit 31 includes four color LEDs, that is, a violet light emitting diode (V-LED) 31a, a blue light emitting diode (B-LED) 31b, a green light emitting diode (G-LED) 31c, and a red light emitting diode (R-LED) 31d.

The LEDs 31a to 31d emit color lights different from each other. For example, the V-LED 31a emits a violet light V having a wavelength range of 380 nm to 420 nm. The B-LED 31b emits a blue light B having a wavelength range of 420 nm to 500 nm. The G-LED 31c emits a green light G having a wavelength range of 480 nm to 600 nm. The R-LED 31d emits a red light R having a wavelength range of 600 nm to 650 nm. Lights emitted from the LEDs 31a to 31d may have the same central wavelength and the same peak wavelength, and may have different central wavelengths and different peak wavelengths.

The light source controller 32 independently controls the turning on or off of each of the LEDs 31a to 31d, the amount of light emitted at the times of turning on thereof, and the like to adjust the emission time, emission period, amount, and spectrum of illumination light. The control of the turning on or off of each of the LEDs, which is performed by the light source controller 32, varies depending on each observation mode. Reference brightness can be set by the user interface 16 or the like.

In the case of a normal mode, the light source controller 32 turns on all the V-LED 31a, the B-LED 31b, the G-LED 31c, and the R-LED 31d. Accordingly, in the normal mode, polychromatic light for a normal mode, which includes a violet light, a blue light, a green light, and a red light, is emitted from the light source device 13 as normal light. Since a violet light, a blue light, a green light, and a red light are mixed in the normal light and the normal light has intensity equal to or higher than certain intensity from a blue light wavelength range to a red light wavelength range, the normal light is a substantially white light. A white light includes not only broadband light that includes all the wavelength ranges of a blue light component, a green light component, and a red light component like a white light emitted from a xenon lamp, but also illumination light in which lights having wavelength ranges of at least three color light components, such as a blue light component, a green light component, and a red light component are mixed.

In the case of a special mode, the light source controller 32 turns on all the V-LED 31a, the B-LED 31b, the G-LED 31c, and the R-LED 31d but sets a light amount ratio between a violet light, a blue light, a green light, and a red light in this case so that a ratio of a violet light is increased. Accordingly, a special light is a bluish light. The case of the normal mode in which a white light is emitted as illumination light will be mainly described below.

Further, the light source device 13 is electrically connected to the processor device 14, and the endoscope-side connector 22 of the endoscope 12 is connected to the processor device 14 via the light source device 13. The transmission and reception of image signals and the like between the light source device 13 and the endoscope-side connector 22 are via wireless communication. For this reason, the light source device 13 outputs image signals and the like, which are transmitted to and received from the endoscope-side connector 22 wirelessly, to the signal transmission unit 35, and the signal transmission unit 35 transmits the image signals and the like to the processor device 14. Furthermore, the light source device 13 supplies power, which is used to drive the image pickup sensor 26 and the like, to the endoscope-side connector 22 but also supplies this power wirelessly.

Figure 4:
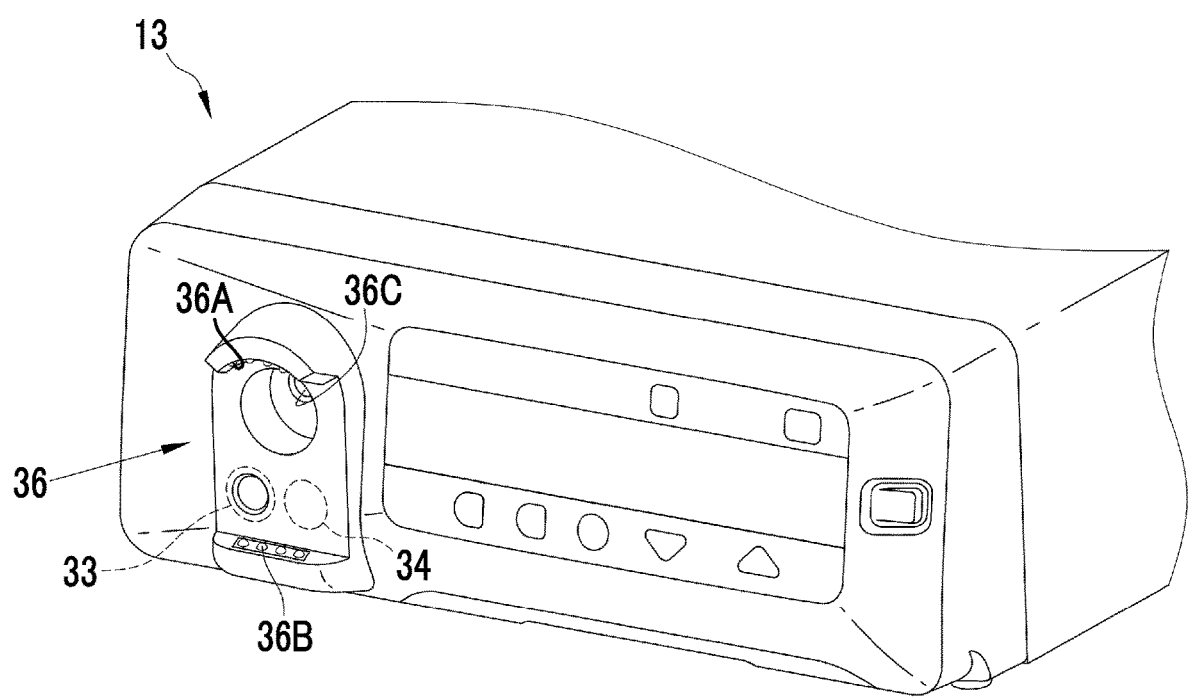
FIG. 4 is an external perspective view of a light source device.

As shown in FIG. 4, the light source device-side connector 36 is provided with the wireless communication unit 33, the wireless power supply unit 34, locking portions 36A and 36B, and a connection hole 36C. In a case where the endoscope-side connector 22 is connected, the locking portions 36A and 36B lock the endoscope-side connector 22 to maintain the connection of the endoscope-side connector 22. The connection hole 36C is a through-hole, and a light guide rod 22A (see FIG. 3) of the endoscope-side connector 22 is inserted into the connection hole 36C.

In a case where the endoscope-side connector 22 is to be connected to the light source device-side connector 36, the light guide rod 22A is inserted into the connection hole 36C of the light source device-side connector 36, so that an incident end 37 (see FIG. 3) of the second light guide 27B faces the light source unit 31 of the light source device 13. Accordingly, illumination light emitted from the light source unit 31 is transmitted via the light guide 27 and is applied to a front side of the insertion unit 17 from the emission end 29.

The wireless communication unit 33 includes an image signal receiving part 33A (see FIG. 3). The image signal receiving part 33A receives image signals from an image signal transmission part 38A of the endoscope-side connector 22. The wireless power supply unit 34 is, for example, a coil (so-called primary coil), and supplies power to a wireless power receiving unit 39 with a contactless power transmission method, such as an electromagnetic induction method or a magnetic resonance method.

In a case where the endoscope-side connector 22 of the endoscope 12 is connected to the light source device-side connector 36 of the light source device 13, illumination light emitted from the light source unit 31 is incident on the second light guide 27B of the endoscope 12 by, for example, a light guide member (not shown), such as a prism or a light guide rod.

The light guide 27 is built in the endoscope 12 including the universal cable 19 and the endoscope-side connector 22, and guides illumination light to a distal end portion 17A of the endoscope 12. The distal end portion 17A is provided with the emission end 29. The emission end 29 is disposed around the image pickup unit 25, and is a distal end of the first light guide 27A. In this embodiment, the image pickup unit 25 and the emission end 29 are exposed from a distal end surface of the distal end portion 17A. Illumination light emitted from the light source unit 31 is guided from the light source unit 31 by the light guide 27 and is applied to the object to be observed from the emission end 29.

The endoscope-side connector 22 is provided with a wireless communication unit 38 and a wireless power receiving unit 39. The wireless communication unit 38 includes an image signal transmission part 38A (see FIG. 3). The image signal transmission part 38A transmits image signals, which are obtained from the image pickup of the object to be observed by the image pickup sensor 26, to the image signal receiving part 33A of the light source device 13 wirelessly. Wireless communication performed by the wireless communication unit 38 is optical communication, and it is preferable that this wireless communication is, for example, near-infrared communication using near-infrared light (light having a wavelength of about 0.7 μm to 2.5 μm).

In a case where the endoscope-side connector 22 and the light source device-side connector 36 are connected to each other, the wireless communication unit 38 can transmit and receive optical signals to and from the wireless communication unit 33 of the light source device 13. That is, image signals of the image signal transmission part 38A are optically transmitted to the image signal receiving part 33A of the light source device 13 in a contactless manner.

The image signals optically transmitted to the image signal receiving part 33A are transmitted to the processor device 14 by the signal transmission unit 35. The image signals, which are transmitted to the processor device 14 from the endoscope 12 via the light source device 13, are displayed on the monitor 15 as an endoscopic image subjected to image processing. The functions of the wireless communication units 33 and 38 are not limited to the above-mentioned functions and may be to transmit and receive control signals that are used to control, for example, the image pickup sensor 26 and the like of the endoscope 12.

The wireless power receiving unit 39 is, for example, a coil (so-called secondary coil) and receives power that is supplied from the wireless power supply unit 34 provided in the light source device 13 with a contactless power transmission method. Since an endoscope that uses a primary coil and a secondary coil to supply power is publicly known in JP2016-67534A (corresponding to US2016/089001A1), the detailed description thereof will be omitted here. The wireless power receiving unit 39 supplies power to each part of the endoscope 12, such as the image pickup sensor 26.

Configuration of Endoscope

Figure 5:
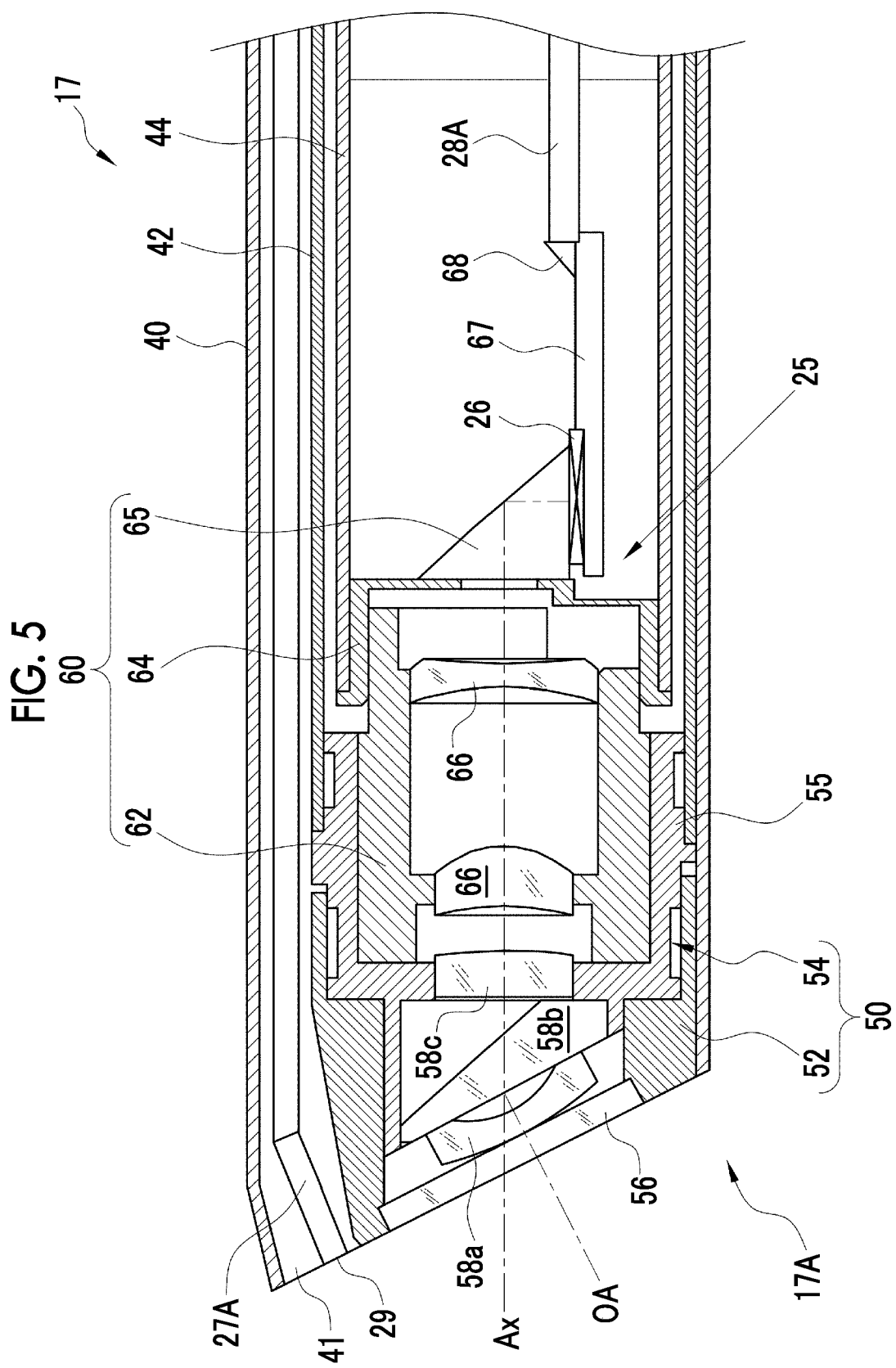
FIG. 5 is a cross-sectional view of a main portion of an insertion unit.

As shown in FIG. 5, the insertion unit 17 comprises a substantially cylindrical outer pipe 40 (also referred to as a mantle pipe) parallel to the insertion axis Ax, a protection sheath 42, and an inner sheath 44. The outer pipe 40 forms an outer peripheral wall of the insertion unit 17. An opening of a distal end portion of the outer pipe 40 is inclined from a posture perpendicular to the insertion axis Ax. Further, as described in detail later, a proximal end portion of the outer pipe 40 is connected to the operation unit 18 (see FIGS. 2 and 6).

The protection sheath 42 is inserted into and disposed in the outer pipe 40. A distal end optical system 50 of the image pickup unit 25 is provided in a distal end portion of the protection sheath 42. Further, as described in detail later, a proximal end portion of the protection sheath 42 is connected to a housing 74 (see FIG. 8) provided in the operation unit 18. Furthermore, an insertion passage 41 for the light guide 27 is formed between an inner peripheral surface of the outer pipe 40 and an outer peripheral surface of the protection sheath 42.

The inner sheath 44 corresponds to a shaft member of the present invention, and is inserted into and disposed in the protection sheath 42. The first signal cable 28A is inserted into the inner sheath 44. A proximal end optical system 60 and the image pickup sensor 26 of the image pickup unit 25 are provided in a distal end portion of the inner sheath 44. Further, as described in detail later, a proximal end portion of the inner sheath 44 is connected to a first connection member 90 (see FIG. 8) provided in the operation unit 18.

The image pickup unit 25 comprises the distal end optical system 50, the proximal end optical system 60, and the image pickup sensor 26. Reference character OA shown in FIG. 5 denotes the optical axis of the optical system of the image pickup unit 25.

The distal end optical system 50 is provided in the distal end portion of the protection sheath 42. The distal end optical system 50 is an oblique-viewing optical system that refracts light, which is incident in a direction inclined with respect to the insertion axis Ax, in a direction parallel to the insertion axis Ax and guides the light to the proximal end optical system 60. The distal end optical system 50 includes a distal end portion body 52 and a distal end lens barrel 54 that is provided in the distal end portion body 52.

The distal end portion body 52 forms the distal end portion 17A of the insertion unit 17 (protection sheath 42) and is a cap (cover) that covers the distal end lens barrel 54. The distal end portion body 52 is formed substantially in the shape of a cylinder parallel to the insertion axis Ax. Further, a cover glass 56, which is in an inclined posture corresponding to an inclination angle of an objective lens 58a provided in the distal end lens barrel 54, is provided at a distal end-side opening portion of the distal end portion body 52.

Furthermore, the distal end portion body 52 is fixed to the inner peripheral surface of the outer pipe 40. Accordingly, the outer pipe 40, the distal end optical system 50, and the protection sheath 42 are integrally moved rotationally in a direction around the insertion axis Ax (hereinafter, simply abbreviated as a direction around the axis).

The distal end lens barrel 54 houses the objective lens 58a, a prism 58b, and a lens 58c. The objective lens 58a is inclined from a posture perpendicular to the insertion axis Ax and faces the cover glass 56. The objective lens 58a emits light, which is incident through the cover glass 56, toward the prism 58b. The prism 58b corresponds to a second refractive optical element of the present invention, and refracts light incident from the objective lens 58a, that is, light incident in a direction inclined with respect to the insertion axis Ax in a direction parallel to the insertion axis Ax, and then emits the light toward the lens 58c. The lens 58c is in a posture perpendicular to the insertion axis Ax, and emits light incident from the prism 58b toward lenses 66 that are provided in a proximal end lens barrel 62 of the proximal end optical system 60 to be described later.

The configuration of an optical system provided in the distal end lens barrel 54 is not particularly limited as long as light incident in a direction inclined with respect to the insertion axis Ax can be guided into the proximal end lens barrel 62.

A tubular portion 55, which extends toward a proximal end of the distal end lens barrel 54, is formed at the distal end lens barrel 54. The tubular portion 55 is externally fitted to be rotatable relative to a distal end portion of the proximal end lens barrel 62 to be described later in the direction around the axis. Accordingly, the proximal end lens barrel 62 is fitted to be rotatable relative to the distal end lens barrel 54 in the direction around the axis. The tubular portion 55 is formed integrally with the distal end lens barrel 54 in this embodiment, but may be formed separately from the distal end lens barrel 54.

The proximal end optical system 60 is provided in the distal end portion of the inner sheath 44, and guides light, which is incident from the distal end lens barrel 54, to the image pickup sensor 26. The proximal end optical system 60 includes the proximal end lens barrel 62, a holder 64, and a prism 65.

The proximal end lens barrel 62 is connected (fixed) to the distal end portion of the inner sheath 44 via the holder 64. A proximal end portion of the proximal end lens barrel 62 may be directly connected to the distal end portion of the inner sheath 44, and the holder 64 may be connected to the proximal end portion of the proximal end lens barrel 62 in the inner sheath 44.

Further, the distal end portion of the proximal end lens barrel 62 is fitted to be rotatable relative to a proximal end-side opening portion of the tubular portion 55 in the direction around the axis as described above. Accordingly, one of the distal end lens barrel 54 and the proximal end lens barrel 62 is rotatable relative to the other thereof in the direction around the axis. A proximal end portion of the distal end lens barrel 54 may be fitted into a distal end-side opening portion of the proximal end lens barrel 62 to be rotatable relative to the distal end-side opening portion of the proximal end lens barrel 62 in the direction around the axis.

A plurality of lenses 66 having an optical axis OA parallel to the insertion axis Ax are provided in the proximal end lens barrel 62. The lenses 66 emit light, which is incident from the distal end lens barrel 54, toward the prism 65.

The holder 64 is formed substantially in the shape of a cylinder parallel to the insertion axis Ax, and is fixed to the distal end portion of the inner sheath 44. Further, the holder 64 is connected and fixed (externally fitted and fixed) to the proximal end portion of the proximal end lens barrel 62. Accordingly, since the inner sheath 44 and the proximal end lens barrel 62 are connected to each other by the holder 64, the inner sheath 44, the proximal end lens barrel 62, and the holder 64 are integrated.

The prism 65 is held at a proximal end-side opening portion of the holder 64, and the image pickup sensor 26 to be described later is held via the prism 65. For this reason, the image pickup sensor 26 is integrated with the inner sheath 44 and the proximal end lens barrel 62 via the holder 64 and the prism 65.

The prism 65 corresponds to a first refractive optical element of the present invention, and is held at the proximal end-side opening portion of the holder 64 as described above. The prism 65 refracts light, which is incident through the proximal end lens barrel 62, by an angle of 90°. A mirror may be used instead of the prism 65.

The image pickup sensor 26 picks up the image of light that passes through the distal end lens barrel 54 and the proximal end lens barrel 62 and that is reflected by the prism 65. The image pickup sensor 26 is provided integrally with a circuit board 67.

The image pickup sensor 26 is, for example, a color sensor including primary color filters, and comprises three types of pixels, that is, B pixels (blue pixels) including blue color filters, G pixels (green pixels) including green color filters, and R pixels (red pixels) including red color filters. The blue color filter mainly transmits violet to blue light. The green color filter mainly transmits green light. The red color filter mainly transmits red light. In a case where the image of the object to be observed is picked up using the primary color image pickup sensor 26 as described above, a maximum of three types of images, that is, a B image (blue image) obtained from B pixels, a G image (green image) obtained from G pixels, and an R image (red image) obtained from R pixels, can be simultaneously obtained.

A charge coupled device (CCD) image sensor or a complementary metal oxide semiconductor (CMOS) image sensor can be applied as the image pickup sensor 26. Further, the image pickup sensor 26 of this embodiment is a primary color sensor, but a complementary color sensor can also be used. A complementary color sensor includes, for example, cyan pixels provided with cyan color filters, magenta pixels provided with magenta color filters, yellow pixels provided with yellow color filters, and green pixels provided with green color filters. In a case where a complementary color sensor is used, images obtained from the respective color pixels described above can be converted into B images, G images, and R images by complementary color-primary color conversion. Further, a monochrome sensor not provided with color filters may be used as the image pickup sensor 26 instead of the color sensor. In this case, the images having the respective colors can be obtained from the sequential image pickup of the object to be observed using illumination light having the respective colors, such as B, G, and R.

The image pickup sensor 26 is mounted on the holder 64 via the prism 65 in this embodiment, but the image pickup sensor 26 may be directly mounted on the proximal end-side opening portion of the holder 64. In this case, it is preferable that the image pickup sensor 26 is held by the holder 64 in a posture perpendicular to the insertion axis Ax (optical axis OA) and has a light-receiving surface orthogonal to the optical axis OA.

The circuit board 67 controls the drive of the image pickup sensor 26. Further, a distal end portion of the first signal cable 28A is connected to the circuit board 67 via a connector 68. Furthermore, the circuit board 67 outputs image signals, which are output from the image pickup sensor 26, to the first signal cable 28A via the connector 68.

Configuration of Operation Unit

Figure 6:
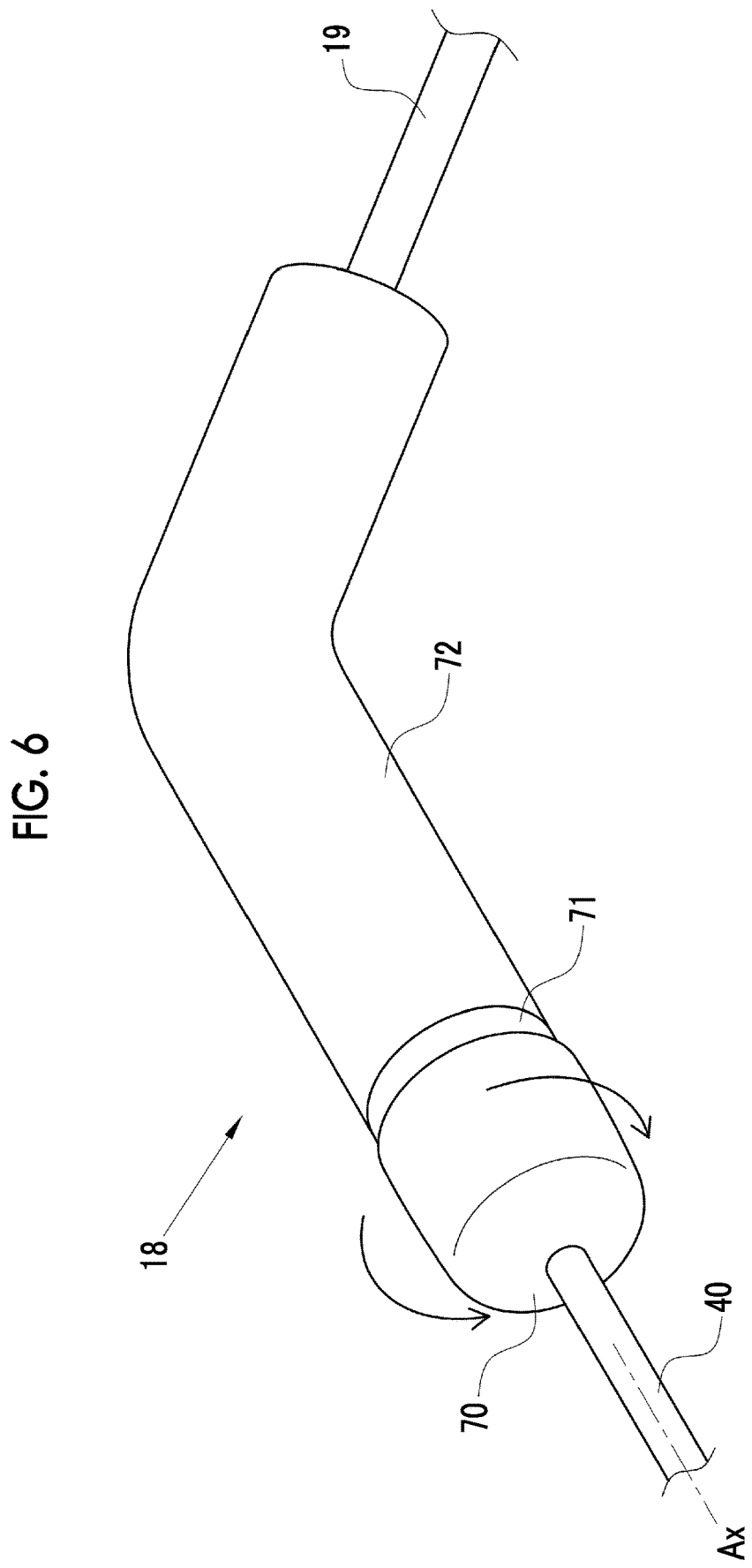
FIG. 6 is an external perspective view of an operation unit.
Figure 7:
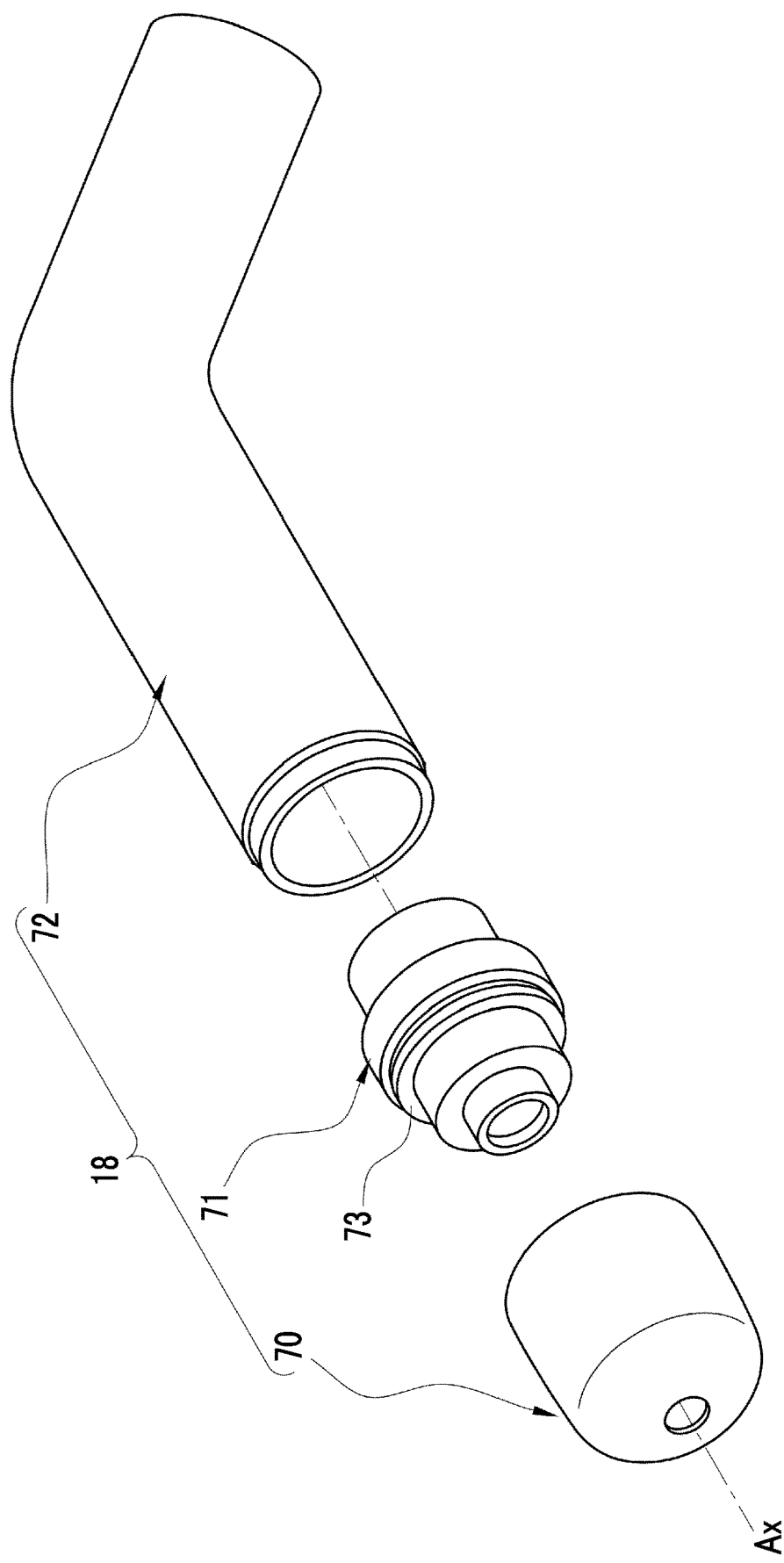
FIG. 7 is an exploded perspective view of the operation unit.

As shown in FIGS. 6 and 7, the operation unit 18 comprises a rotational moving operation member 70, a connecting member 71, and an operation unit body 72. The operation unit 18 is formed of, for example, a resin component and has high stiffness. The rotational moving operation member 70 is an operation ring that is formed substantially in the shape of a cylinder parallel to the insertion axis Ax, and receives a rotational moving operation that is performed in the direction around the axis by a user.

The proximal end portion of the above-mentioned outer pipe 40 is connected to a distal end portion of the rotational moving operation member 70. Accordingly, in a case where the rotational moving operation member 70 is operated to rotationally move in the direction around the axis, the protection sheath 42 and the distal end optical system 50 (the distal end portion body 52 and the distal end lens barrel 54) are rotationally moved in the same direction via the outer pipe 40. Therefore, the visual field direction (observation direction, see the optical axis OA shown in FIG. 5) of the endoscope 12 can be rotationally moved in the direction around the insertion axis Ax (a circumferential direction of the insertion unit 17 and the rotational moving operation member 70).

The connecting member 71 is formed in a substantially cylindrical shape. A seal member 73 is externally fitted to an outer peripheral surface of a distal end portion of the connecting member 71. Further, the connecting member 71 is fitted to an inner peripheral surface of a proximal end portion of the rotational moving operation member 70 via the seal member 73 to be rotationally movable. The seal member 73 is an annular shape and, for example, OMNISEAL, an O-ring, or the like is used as the seal member 73.

The operation unit body 72 is formed in the shape of a pipe bent in an L shape, and has an outer shape that allows a human user to grip the operation unit body 72 by hand. The connecting member 71 is fixed to a distal end portion of the operation unit body 72. Accordingly, the operation unit body 72 supports the rotational moving operation member 70 via the connecting member 71 so that the rotational moving operation member 70 is rotationally movable. That is, in a case where a rotational movement force for rotationally moving the rotational moving operation member 70 in the direction around the axis is applied, this rotational movement force is not transmitted to the operation unit body 72.

The rotational moving operation member 70 is rotationally movable in a predetermined angle range in the direction around the axis, and can be rotationally moved in a range of, for example, 0° to 170° clockwise and counterclockwise, respectively.

Figure 8:
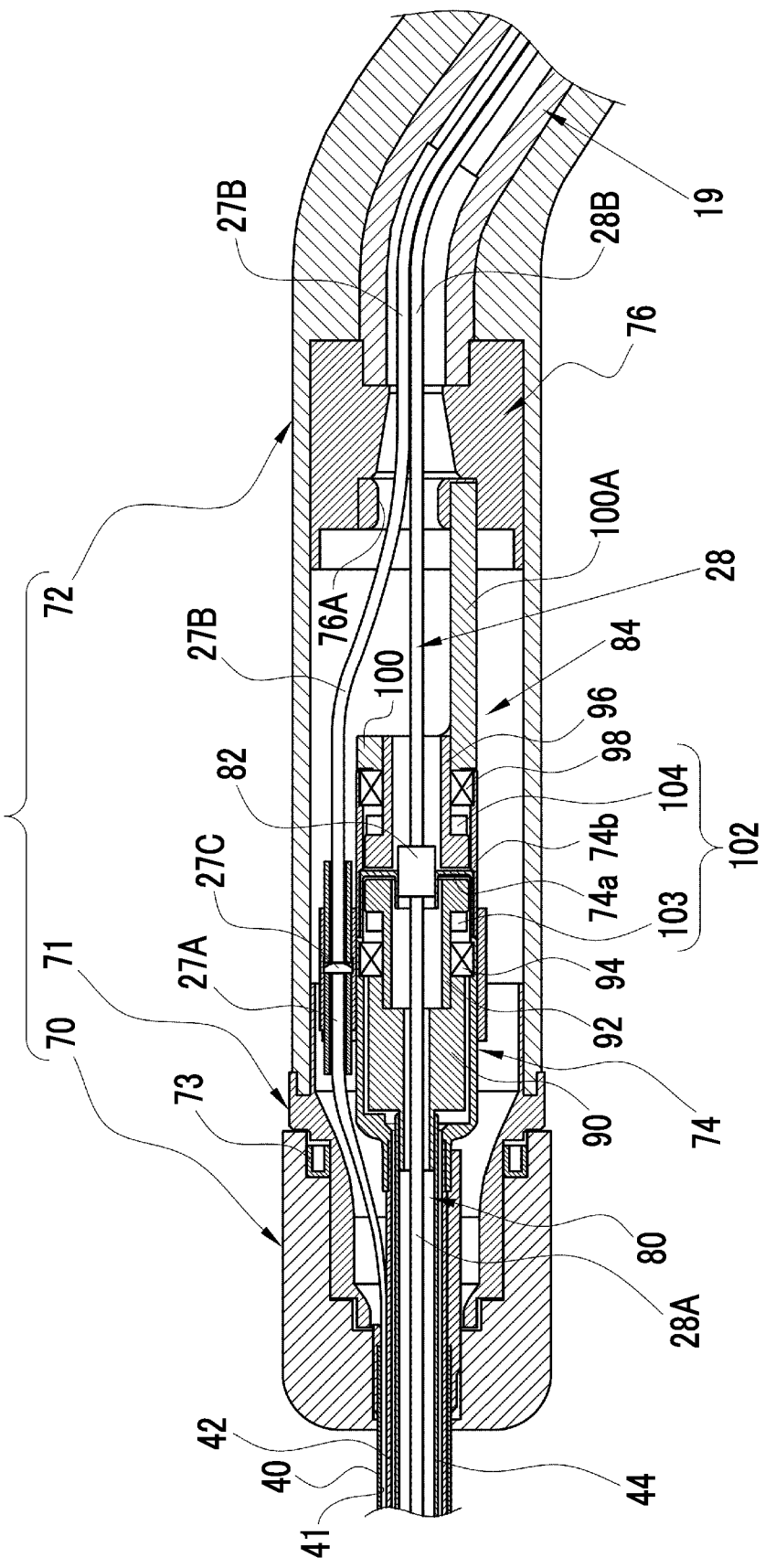
FIG. 8 is a cross-sectional view of a main portion of the operation unit.

As shown in FIG. 8, the proximal end portions of the protection sheath 42 and the inner sheath 44 in addition to the above-mentioned outer pipe 40 are inserted into a distal end-side opening portion of the rotational moving operation member 70. In addition, a housing 74, a connection unit 110, and a holding member 111 (see FIGS. 9 and 10) are provided in the operation unit 18. As described in detail later, the connection unit 110 and the holding member 111 hold the first light guide 27A, the second light guide 27B, and the lens member 27C.

Further, a fixing member 76 is inserted into the operation unit body 72. The fixing member 76 is formed substantially in the shape of a cylinder including a through-hole 76A parallel to the insertion axis Ax. The second light guide 27B and the second signal cable 28B are inserted into the through-hole 76A. A proximal end portion of the fixing member 76 is fixed to the operation unit body 72, so that the operation unit body 72 and the fixing member 76 are integrated with each other. As described in detail later, the fixing member 76 is connected to a magnet coupling 102 via a second connection member 100 and a second bearing receiving member 96.

The housing 74 is formed substantially in the shape of a pipe parallel to the insertion axis Ax to have a diameter smaller than inner diameters of the rotational moving operation member 70, the connecting member 71, and the operation unit body 72, and is housed in the operation unit 18. The housing 74 is supported in an internal space of the operation unit 18 by the protection sheath 42, the fixing member 76, and the like. A distal end side of the housing 74 is connected to the proximal end portion of the protection sheath 42. Accordingly, the housing 74 and the protection sheath 42 are integrally moved rotationally in the direction around the axis. As a result, in a case where a rotational movement force for rotationally moving the rotational moving operation member 70 in the direction around the axis is applied, this rotational movement force is transmitted to the outer pipe 40, the distal end optical system 50, the protection sheath 42, and the housing 74. Accordingly, the outer pipe 40, the distal end optical system 50, the protection sheath 42, and the housing 74 are rotationally moved in the same direction as the rotational moving operation member 70.

The proximal end portion of the inner sheath 44 and a proximal end portion of the first signal cable 28A are disposed in the housing 74. Further, a partition wall 74a perpendicular to the insertion axis Ax is provided in the housing 74, for example, in a proximal end-side opening portion of the housing 74. The partition wall 74a closes the proximal end-side opening portion of the housing 74.

A tubular portion 74b parallel to the insertion axis Ax is provided on a proximal end side of the housing 74. Further, the tubular portion 74b may be formed integrally with the housing 74. As described in detail later, a distal end portion of the second signal cable 28B is disposed in the tubular portion 74b in addition to a part of a connecting unit 84.

Figure 9:
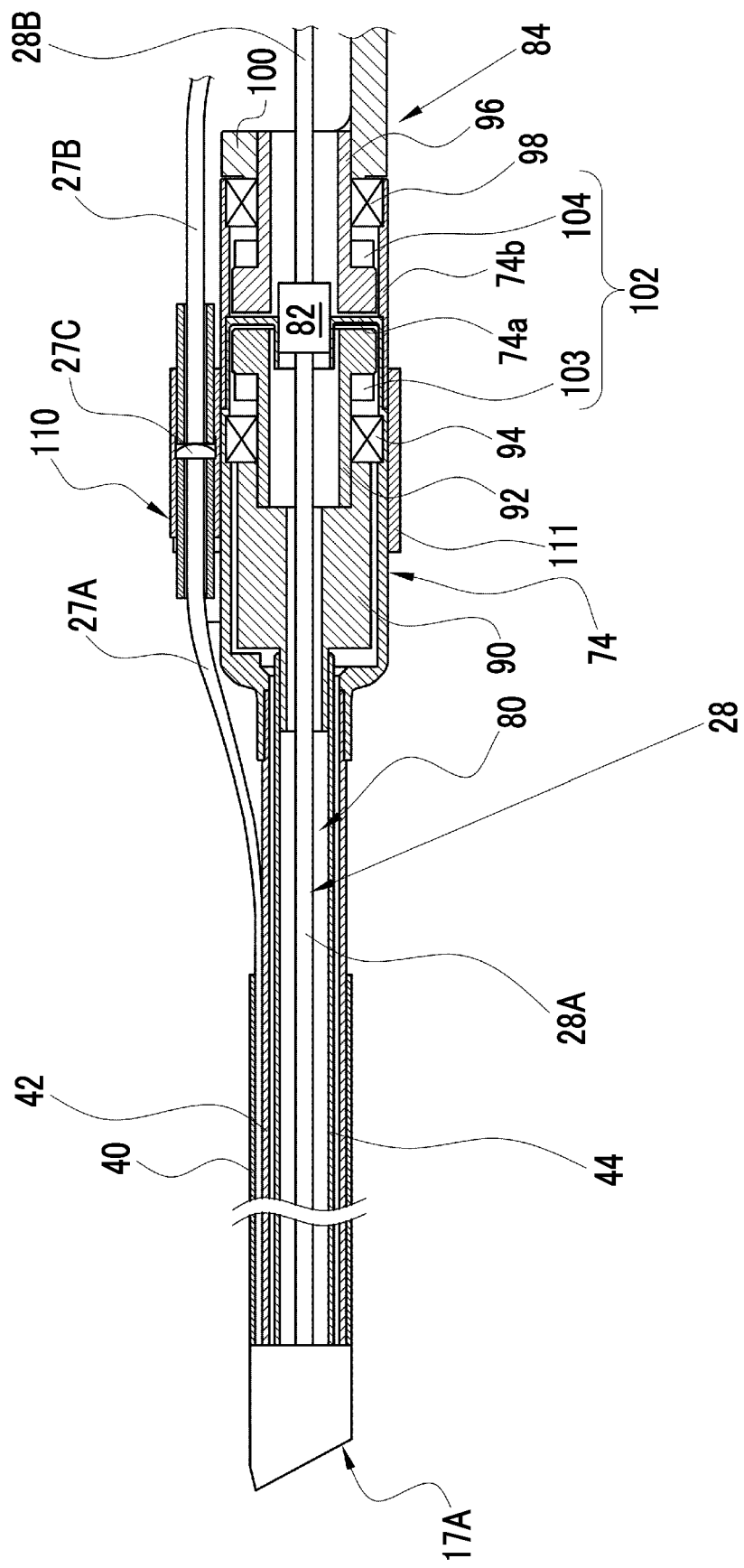
FIG. 9 is a cross-sectional view of a main portion of the endoscope from which a rotational operation member, a connecting member, and an operation unit body are omitted.

As shown in FIG. 9, a sealed space 80 (air-tight space) is formed in the protection sheath 42 and the housing 74, and the inner sheath 44, the image pickup sensor 26, the first signal cable 28A, and the like are disposed in this sealed space 80. FIG. 9 is a cross-sectional view of a portion near the protection sheath 42 and the housing 74, and the rotational moving operation member 70, the connecting member 71, the operation unit body 72, and the like are omitted.

A distal end side of the sealed space 80 is defined by the distal end optical system 50. Further, a proximal end side of the sealed space 80 is defined by the partition wall 74a. Accordingly, the moisture-proof property of the image pickup unit 25 is improved, so that fogging is prevented. Furthermore, since the seal member 73 is interposed between the rotational operation member 70 and the housing 74 as described above, the airtightness of the sealed space 80 is further improved.

As shown in FIGS. 8 and 9, the partition wall 74a already described, the air-tight connector 82, and the connecting unit 84 are provided in the housing 74 and the tubular portion 74b. The air-tight connector 82 is provided to pass through the inside and the outside of the sealed space 80 and to be rotatable relative to the partition wall 74a in the direction around the axis. The air-tight connector 82 electrically connects the first signal cable 28A provided in the housing 74 (in the sealed space 80) to the second signal cable 28B provided in the tubular portion 74b (outside the sealed space 80).

The connecting unit 84 is provided in the housing 74 and the tubular portion 74b to be rotatable relative to the housing 74 and the tubular portion 74b in the direction around the axis. The first signal cable 28A and the second signal cable 28B are inserted into the connecting unit 84. The connecting unit 84 magnetically connects the proximal end portion of the inner sheath 44 provided in the housing 74 (in the sealed space 80) to the fixing member 76 provided outside the sealed space 80 with the partition wall 74a interposed therebetween.

The connecting unit 84 comprises a first connection member 90, a first bearing receiving member 92, a first bearing 94, a second bearing receiving member 96, a second bearing 98, a second connection member 100, and a magnet coupling 102.

The first connection member 90 and the first bearing receiving member 92 are provided in the housing 74 (in the sealed space 80), and are formed substantially in the shape of a pipe parallel to the insertion axis Ax. Further, the first signal cable 28A is inserted into the first connection member 90 and the first bearing receiving member 92.

The first connection member 90 connects the proximal end portion of the inner sheath 44 to the first bearing receiving member 92 in the housing 74 (in the sealed space 80). Accordingly, the first bearing receiving member 92 is connected to the proximal end side of the inner sheath 44 via the first connection member 90.

A distal end side of the first bearing receiving member 92 is connected to the first connection member 90 as described above. Further, the first bearing 94, which is to be inscribed in the housing 74, is fixed to an outer peripheral surface of the first bearing receiving member 92. Accordingly, the first bearing receiving member 92 and first magnets 103 are held in the housing 74 to be rotatable relative to the housing 74 in the direction around the axis. Publicly known various radial bearings, such as a ball bearing and a roller bearing, are used as the first bearing 94.

The second bearing receiving member 96 is provided in the tubular portion 74b (outside the sealed space 80), and the second connection member 100 is provided between the second bearing receiving member 96 and the fixing member 76. The second bearing receiving member 96 and the second connection member 100 are formed substantially in the shape of a pipe parallel to the insertion axis Ax, and the second signal cable 28B is inserted into each of the second bearing receiving member 96 and the second connection member 100.

A proximal end portion of the second bearing receiving member 96 is connected to the second connection member 100. Further, a second bearing 98, which is to be inscribed in the tubular portion 74b, is fixed to an outer peripheral surface of the second bearing receiving member 96. Accordingly, the second bearing receiving member 96 and second magnets 104 are held in the tubular portion 74b to be rotatable relative to the tubular portion 74b in the direction around the axis. Publicly known various radial bearings are also used as the second bearing 98 as in the case of the first bearing 94.

The second connection member 100 is integrally provided with a connection piece 100A that is parallel to the insertion axis Ax and that protrudes toward the fixing member 76. The connection piece 100A is fixed to the fixing member 76 by, for example, screwing or the like. Accordingly, the fixing member 76 and the second bearing receiving member 96 are connected to each other via the second connection member 100. Since the second connection member 100 and the fixing member 76 are connected to each other via the connection piece 100A as described above, the second signal cable 28B is exposed from a gap between the second connection member 100 and the fixing member 76 (see FIG. 10).

The magnet coupling 102 includes a plurality of first magnets 103 provided in the housing 74 (in the sealed space 80) and a plurality of second magnets 104 provided in the tubular portion 74b (outside the sealed space 80) with the partition wall 74a interposed therebetween. The magnet coupling 102 is a magnetic connecting member that magnetically connects the first bearing receiving member 92 to the second bearing receiving member 96.

The first magnets 103 and the second magnets 104 are arranged at positions facing each other with the partition wall 74a interposed therebetween, and are arranged in a circle around the insertion axis Ax. Accordingly, the first magnets 103 and the second magnets 104 are magnetically connected to each other in a direction parallel to the insertion axis Ax (axial direction) with the partition wall 74a interposed therebetween. As a result, the inner sheath 44 and the operation unit body 72 are magnetically connected to each other via the magnet coupling 102.

Since the inner sheath 44 and the operation unit body 72 are magnetically connected to each other via the magnet coupling 102, torque (stop torque, rotational torque) can be transmitted to the inner sheath 44 from the operation unit body 72. Accordingly, in a case where a user rotationally moves the rotational operation member 70, the rotational movement of the inner sheath 44 (the proximal end optical system 60 and the image pickup sensor 26) and of the protection sheath 42 in the direction around the axis is prevented, that is, the posture of the inner sheath 44 in the direction around the axis is maintained by the magnet coupling 102.

Configuration of Light Guide and Connection Unit

The light guide 27 includes the first light guide 27A, the second light guide 27B, and the lens member 27C. Each of the first light guide 27A and the second light guide 27B is a fiber bundle in which optical fibers are bundled. The light guide 27 corresponds to a light guide part of the claims, and the lens member 27C corresponds to an optical member of the claims. The optical fibers forming the first light guide 27A and the second light guide 27B are, for example, quartz fibers or multi-component fibers.

In this embodiment, a fiber bundle having a large numerical aperture (NA) is used as the first light guide 27A, and a fiber bundle having high light transmittance is used as the second light guide 27B. The fiber bundle having a large numerical aperture and the fiber bundle having high light transmittance, which are different types of fiber bundles, are used as described above, and the fiber bundle having high light transmittance (second light guide 27B) is made long so that an end portion of the fiber bundle is disposed at a position as close as possible to a distal end of the endoscope 12. Accordingly, the light guide 27 can suppress the loss of the amount of illumination light emitted from the light source unit 31, and can widen light distribution at the emission end 29 of the first light guide 27A. That is, the light guide 27 can obtain good optical performance in which the amount of light and light distribution are well-balanced.

In this embodiment, the first light guide 27A, a part of the second light guide 27B, and the lens member 27C are disposed in the operation unit 18, and, more specifically, are disposed in the operation unit body 72.

Figure 10:
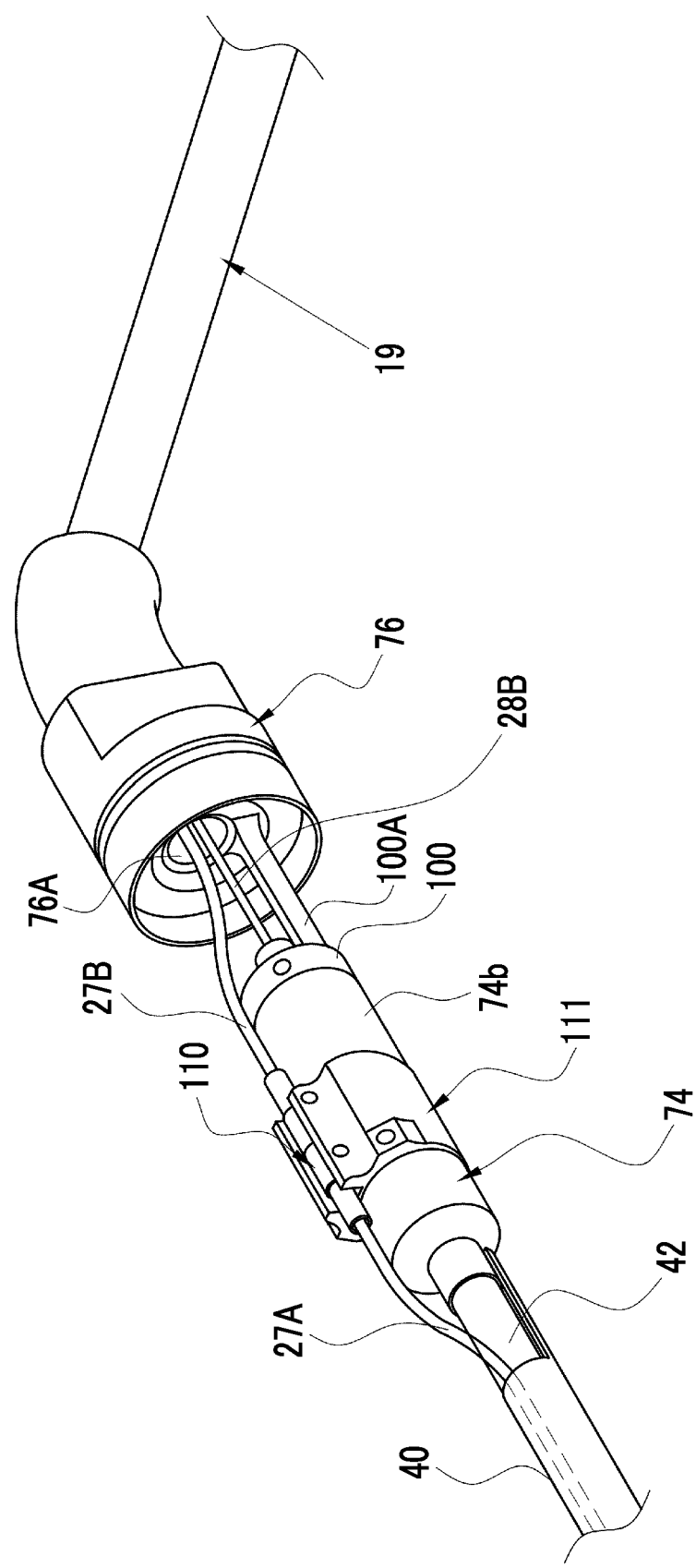
FIG. 10 is a perspective view of a portion near a connection unit and a holding member.
Figure 11:
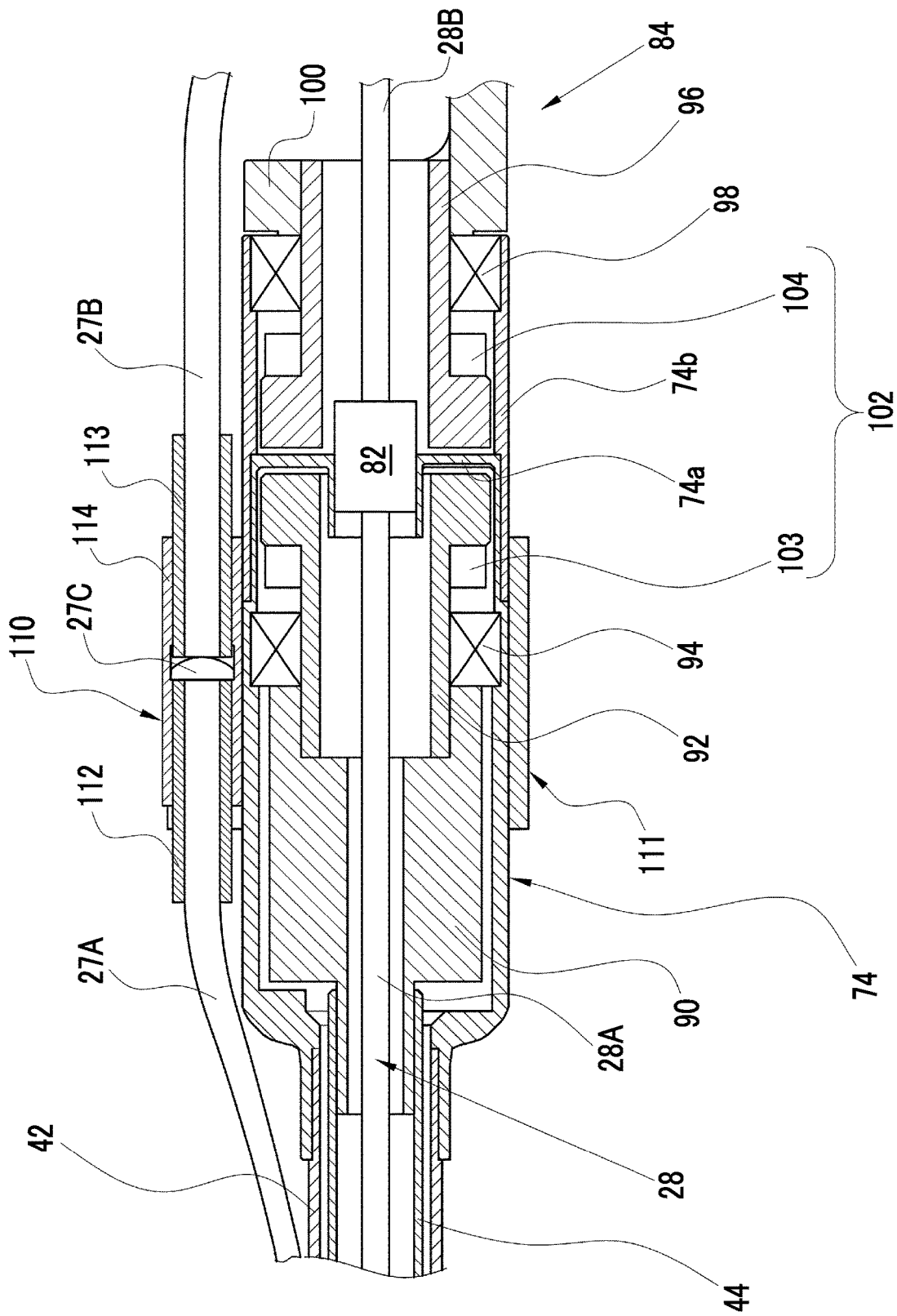
FIG. 11 is a cross-sectional view of a main portion of an endoscope that shows a positional relationship between a first light guide, a second light guide, and a lens member.

As shown in FIGS. 10 and 11, the first light guide 27A, the second light guide 27B, and the lens member 27C are held by the connection unit 110 and are optically connected to each other. In addition, the first light guide 27A, the second light guide 27B, the lens member 27C, and the connection unit 110 are held by the holding member 111 and are fixed to the housing 74.

The connection unit 110 comprises a first ferrule 112, a second ferrule 113, and a lens holder 114. The first ferrule 112 is formed in a cylindrical shape, and is adhered and fixed to a proximal end portion of the first light guide 27A by, for example, an adhesive or the like. The second ferrule 113 is formed in a cylindrical shape, and is adhered and fixed to a distal end portion of the second light guide 27B by, for example, an adhesive or the like.

The lens holder 114 is formed in a cylindrical shape, and has an inner peripheral surface corresponding to an outer peripheral surface of the lens member 27C. The lens member 27C is held on the inner peripheral surface of the lens holder 114. The lens holder 114 is formed to have a dimension larger than the dimension of the lens member 27C in the axial direction. The first ferrule 112 is inserted up to a position close to the lens member 27C from a distal end side of the lens holder 114 together with the first light guide 27A, and is fitted to the inner peripheral surface of the lens holder 114.

The second ferrule 113 is inserted up to a position close to the lens member 27C from a proximal end side of the lens holder 114 together with the second light guide 27B, and is fitted to the inner peripheral surface of the lens holder 114. As described above, the first light guide 27A is held on the distal end side of the lens holder 114 together with the first ferrule 112, and the second light guide 27B is held on the proximal end side of the lens holder 114 together with the second ferrule 113. Accordingly, the first light guide 27A and the second light guide 27B are optically connected to each other, and the lens member 27C is disposed between the first light guide 27A and the second light guide 27B.

Configuration of Holding Member

Figure 12:
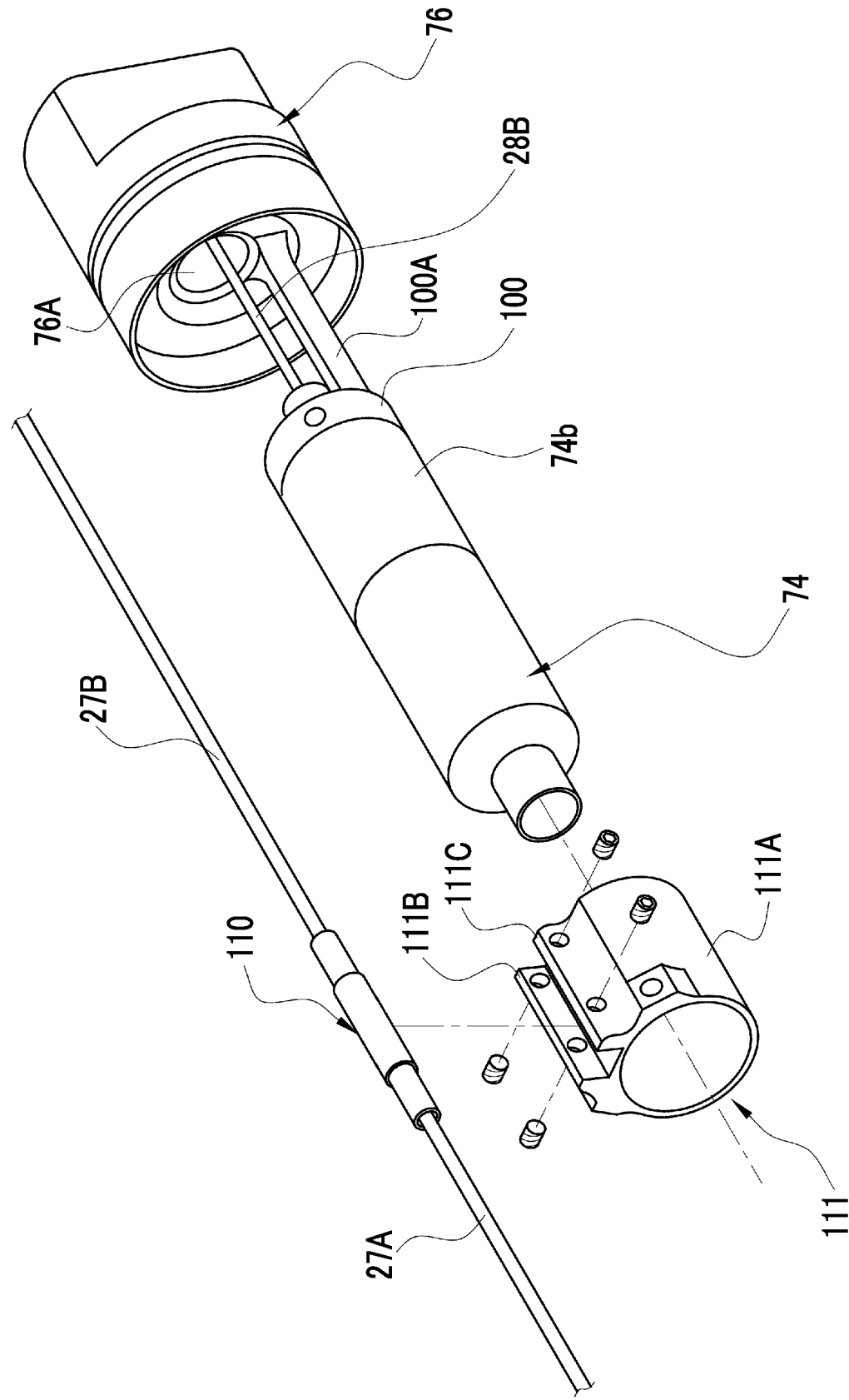
FIG. 12 is an exploded perspective view of a portion near the connection unit and the holding member.

As shown in FIG. 12, the holding member 111 is formed in a tubular shape. Specifically, the holding member 111 includes a cylindrical portion 111A that is parallel to the insertion axis Ax and a pair of protruding portions 111B and 111C that protrudes from an outer peripheral surface of the cylindrical portion 111A. The cylindrical portion 111A is externally fitted to an outer peripheral surface of the housing 74 and is fixed to the housing 74 by, for example, screwing. As described above, the housing 74 is connected to the protection sheath 42. Accordingly, the holding member 111 is fixed to the protection sheath 42 via the housing 74.

The protruding portions 111B and 111C are parallel to each other and are formed in a rectangular shape. The connection unit 110 is interposed between the protruding portions 111B and 111C, and is fixed to the holding member 111 by, for example, screwing. Accordingly, the first light guide 27A, the second light guide 27B, the lens member 27C, and the connection unit 110 are held on an outer peripheral surface side of the holding member 111. That is, the first light guide 27A, the second light guide 27B, the lens member 27C, and the connection unit 110 are fixed to the protection sheath 42 via the holding member 111 and the housing 74.

Since the protection sheath 42 is rotationally moved in the direction around the insertion axis Ax as described above, the connection unit 110 fixed to the protection sheath 42 and the first light guide 27A, a part of the second light guide 27B, and the lens member 27C held by the connection unit 110 are also rotationally moved in the direction around the axis together with the protection sheath 42 via the holding member 111 and the housing 74.

Further, since the protection sheath 42 is rotationally moved in the same direction as the rotational moving operation member 70 by the rotational movement force of the rotational moving operation member 70 as described above, the first light guide 27A, a part of the second light guide 27B, and the lens member 27C are also rotationally moved in the same direction as the rotational moving operation member 70 together with the protection sheath 42.

As described above, the first light guide 27A and the second light guide 27B are fixed to the protection sheath 42 via the holding member 111 and the housing 74. Meanwhile, the signal cable 28 is inserted into the inner sheath 44, and the inner sheath 44 is inserted into the protection sheath 42. Accordingly, in a case where the first light guide 27A and the second light guide 27B are rotationally moved together with the protection sheath 42, the first light guide 27A and the second light guide 27B are rotationally moved at positions outside the signal cable 28 in a radial direction.

Figure 13A:
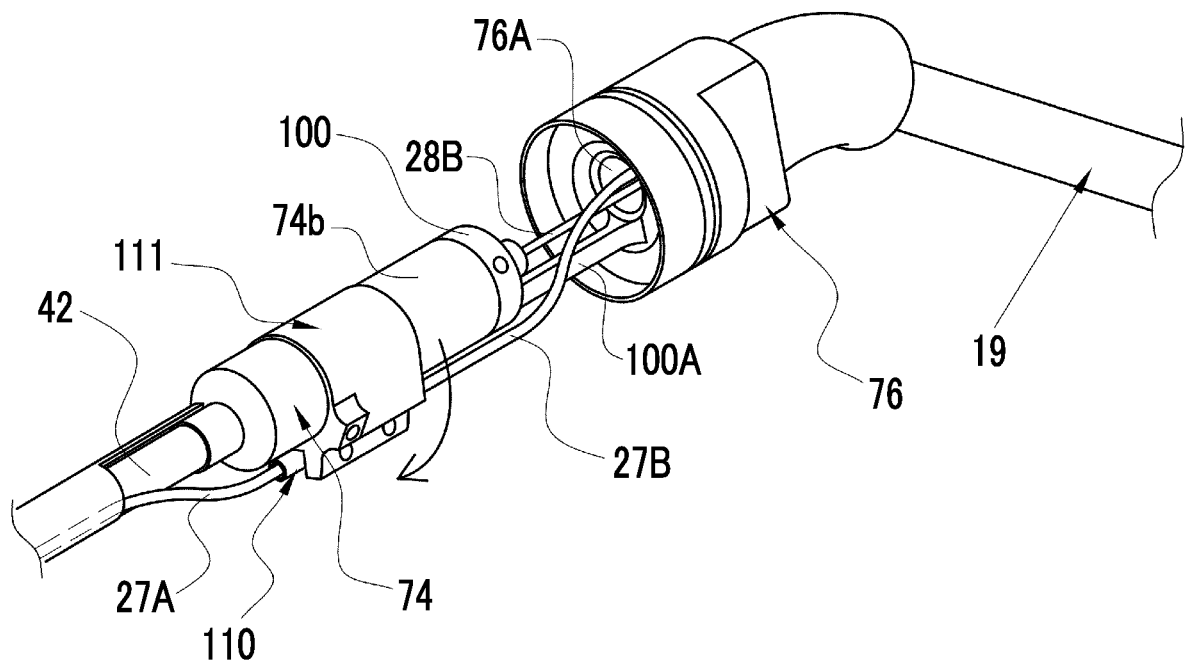
FIG. 13A is a perspective view of a portion near the connection unit and the holding member in a case where a protection sheath is rotationally moved clockwise.
Figure 13B:
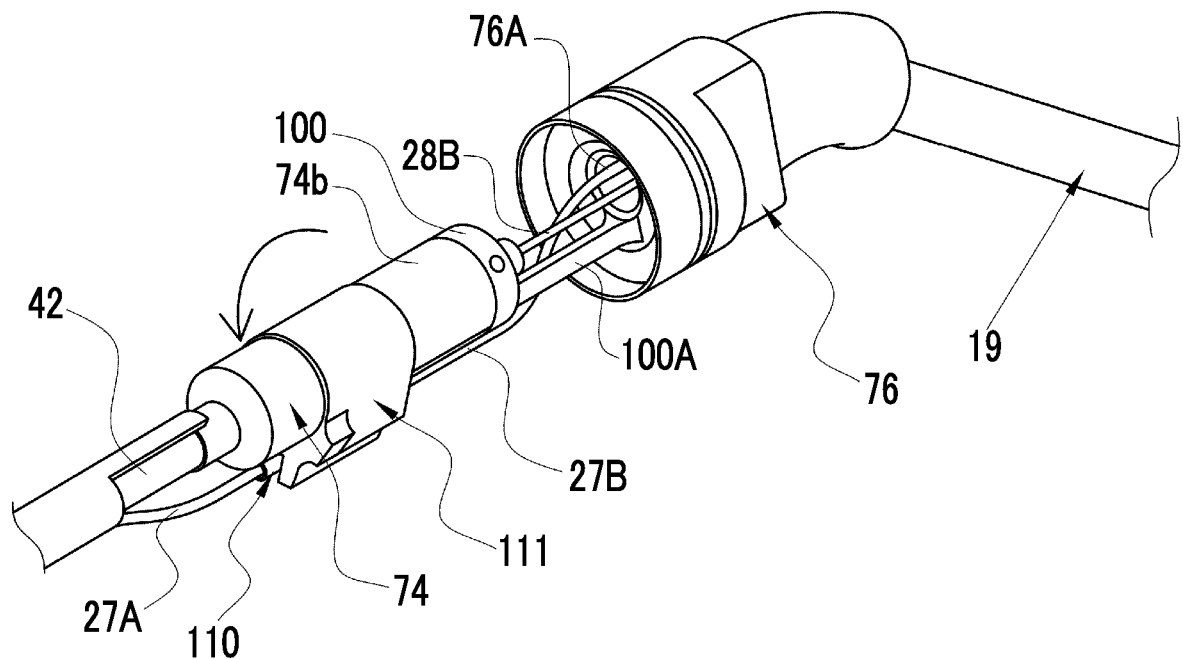
FIG. 13B is a perspective view of the portion near the connection unit and the holding member in a case where the protection sheath is rotationally moved counterclockwise.

FIG. 13A shows a case where the protection sheath 42 and the housing 74 are rotationally moved clockwise, and FIG. 13B shows a case where the protection sheath 42 and the housing 74 are rotationally moved counterclockwise. In either case, the first light guide 27A and the second light guide 27B are rotationally moved at positions outside the signal cable 28 in the radial direction in a case where the first light guide 27A and the second light guide 27B are rotationally moved together with the protection sheath 42.

As described above, the second signal cable 28B is exposed from a gap between the second connection member 100 and the fixing member 76 (see also FIG. 10). Further, the second light guide 27B and the second signal cable 28B are inserted into the through-hole 76A of the fixing member 76 together. In a case where the positions of the second light guide 27B and the second signal cable 28B are close to each other, there is a possibility that the second light guide 27B and the second signal cable 28B will be entangled with each other. However, in the present invention, the first light guide 27A and the second light guide 27B are rotationally moved at positions outside the signal cable 28 in the radial direction (the states shown in FIGS. 13A and 13B) in a case where the first light guide 27A and the second light guide 27B are rotationally moved together with the protection sheath 42. Accordingly, the second light guide 27B and the second signal cable 28B are not entangled with each other, and the disconnection thereof can be prevented.

Configuration of Lens Member

As shown in FIG. 11, the lens member 27C is a plano-convex lens of which an incident side is convex and an emission side is planar. The lens member 27C may be a biconvex lens, a meniscus lens, or the like without being limited thereto. It is preferable that an antireflection film called an anti-reflective (AR) coating is formed on each lens surface of the lens member 27C. Accordingly, a reduction in the amount of illumination light in the light guide 27 can be further prevented.

Figure 14:
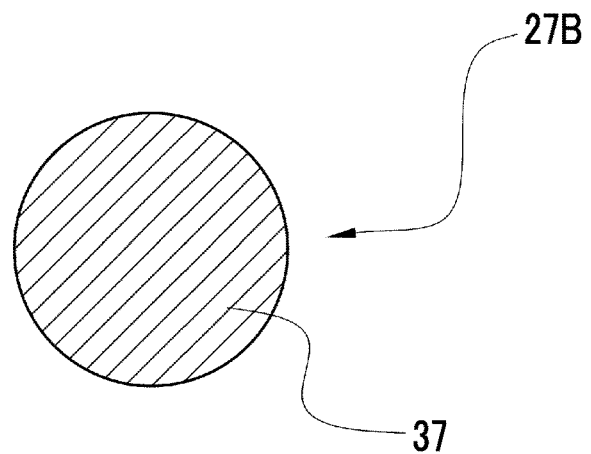
FIG. 14 is an end view showing the shape of an end surface of an incident end of the second light guide.
Figure 15:
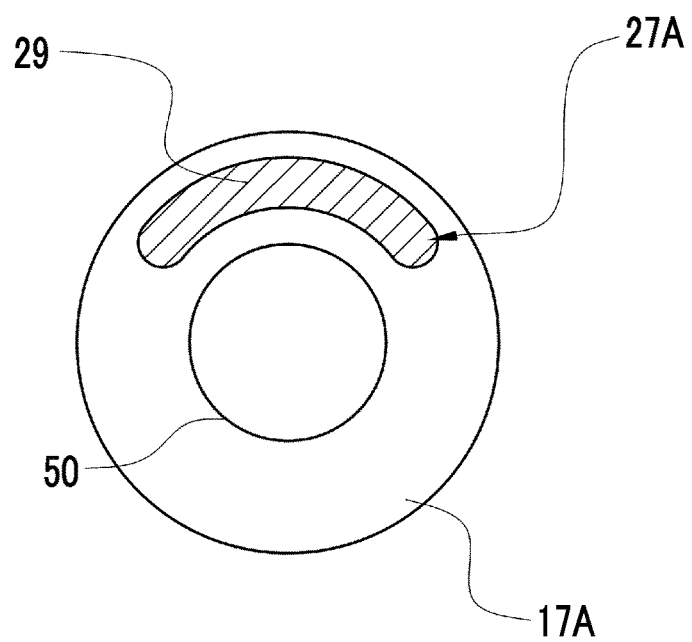
FIG. 15 is an end view showing the shape of an end surface of an emission end of the first light guide.

In the light guide 27 of this embodiment, the incident end 37 of the second light guide 27B facing the light source unit 31 is a circular end surface as shown in FIG. 14, but the emission end 29 of the first light guide 27A at the distal end portion 17A is formed in the shape of an arc positioned around the distal end optical system 50 as shown in FIG. 15 for the convenience of the disposition of components at the distal end portion 17A. Accordingly, it is difficult to dispose the lens member 27C at the distal end portion 17A. On the other hand, since there is no component that hinders the disposition of the lens member 27C in the operation unit 18, it is easy to dispose the lens member 27C in the operation unit 18.

The lens member 27C is a lens for preventing a reduction in the amount of illumination light that is guided by the first light guide 27A and the second light guide 27B and that is emitted from the emission end 29, and deterioration in the distribution of the illumination light. Specifically, the lens member 27C is a lens for suppressing a variation in the relative intensity of each color light of the illumination light, which is guided by the first light guide 27A and the second light guide 27B and is emitted from the emission end 29, with respect to a light distribution angle.

Figure 16:
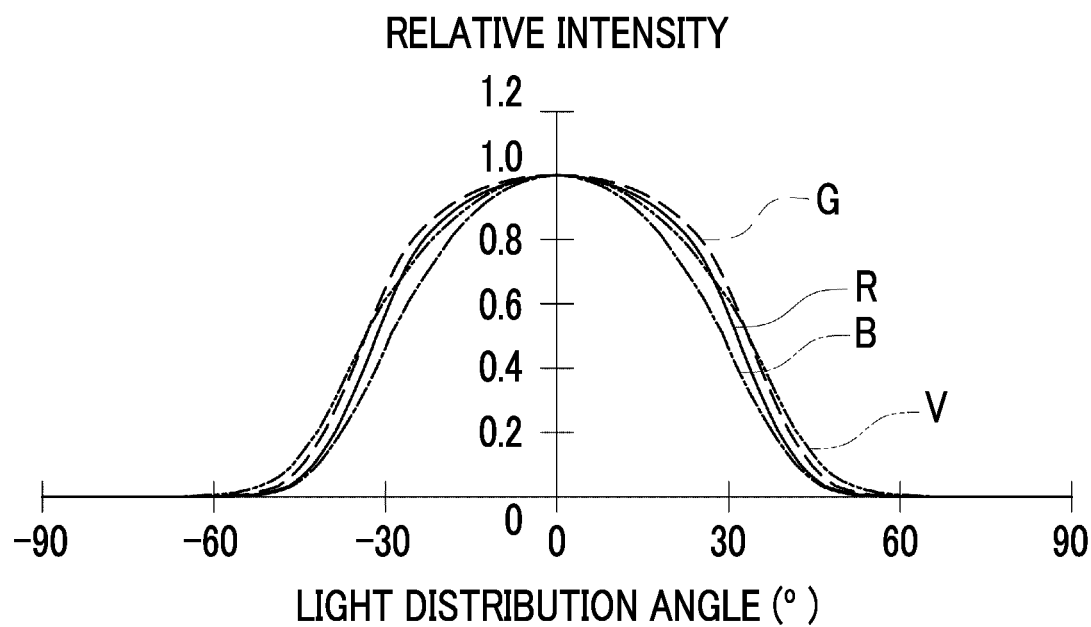
FIG. 16 shows illumination characteristics showing the relative intensity of each color light of illumination light with respect to a light distribution angle at a position in a light guide part where the illumination light does not yet pass through a lens member.
Figure 17:
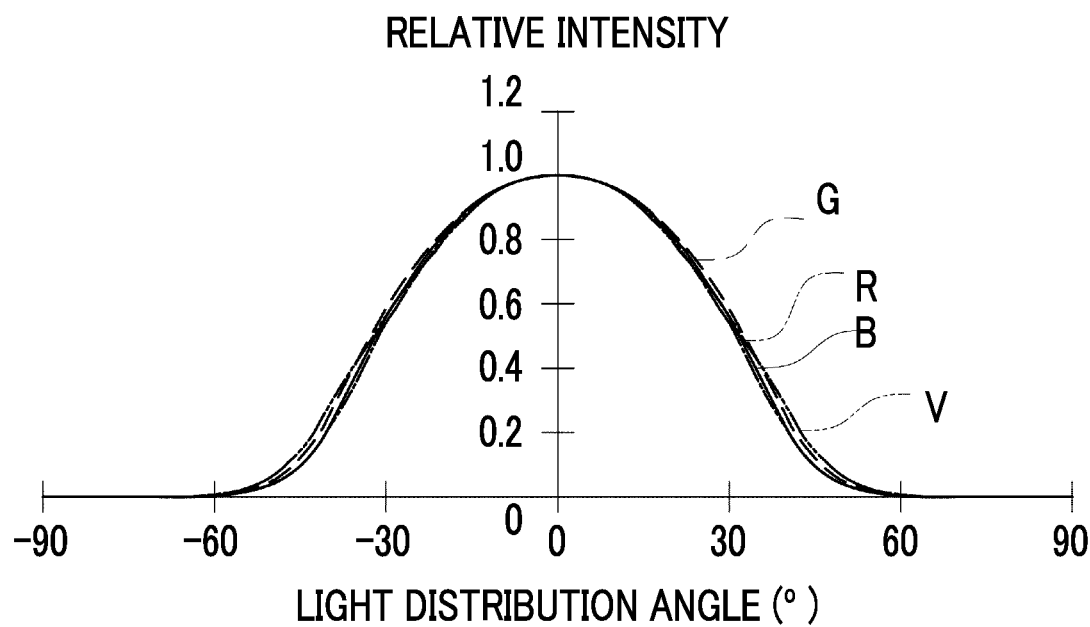
FIG. 17 shows illumination characteristics showing the relative intensity of each color light of illumination light with respect to a light distribution angle at a position in the light guide part where the illumination light has passed through the lens member.

Graphs shown in FIGS. 16 and 17 are the measurement results of the illumination characteristics showing the relative intensity of each color light (LED light) of the illumination light with respect to a light distribution angle at a position (FIG. 16) in the light guide 27 where the illumination light does not yet pass through the lens member 27C and at a position (FIG. 17) in the light guide 27 where the illumination light has passed through the lens member 27C. The relative intensity mentioned here is a ratio of the intensity of each color LED light at a light distribution angle other than 0° to the intensity of each color LED light at a light distribution angle of 0° in a case where the intensity of each color LED light at a light distribution angle of 0° is set as 1. The intensity of light is the density of the luminous flux of light within a unit solid angle.

As shown in FIG. 16, a violet light V, a blue light B, a green light G, and a red light R, which are LED lights emitted from the light source unit 31 and guided by the second light guide 27B, have variations in relative intensity with respect to a light distribution angle at a position where the illumination light does not yet pass through the lens member 27C, specifically, at the emission end of the second light guide 27B. Particularly, a variation in relative intensity at a light distribution angle of about ±25° is large.

On the other hand, as shown in FIG. 17, a violet light V, a blue light B, a green light G, and a red light R, which are LED lights emitted from the light source unit 31 and guided by the light guide 27, have the same relative intensity with respect to a light distribution angle at a position where the illumination light has passed through the lens member 27C, specifically, at the emission end 29 of the first light guide 27A. That is, a variation in relative intensity can be suppressed. The same relative intensity mentioned here means that a difference in the relative intensities of the respective color lights of the illumination light with respect to a light distribution angle is very small, and it is preferable that all the relative intensities of a violet light V, a blue light B, and a red light R have a difference of ±5% or less from the relative intensity of a green light G in a case where the relative intensity of a green light G is used as a reference.

As described above, in this embodiment, the light guide 27 includes the first light guide 27A, the second light guide 27B, and the lens member 27C, and the first light guide 27A, the second light guide 27B, and the lens member 27C are fixed in the operation unit 18. Accordingly, the positions of the optical axes of the first light guide 27A, the second light guide 27B, and the lens member 27C are not shifted from each other. For this reason, the light guide 27 can prevent a reduction in the amount of illumination light and deterioration in the distribution of the illumination light by the lens member 27C regardless of the operation state of the endoscope 12.

Further, the endoscope 12 connects the first light guide 27A to the second light guide 27B in the operation unit 18. In a case where the first light guide 27A and the second light guide 27B are connected to each other in the distal end portion 17A of the insertion unit 17 or in the endoscope-side connector 22, the length of one of the first light guide 27A and the second light guide 27B is significantly lengthened (the length is substantially the same as a total length from the distal end portion 17A to the endoscope-side connector 22, for example, 3.5 m). For this reason, it is difficult to handle the endoscope, and the ease of assembly of the endoscope is poor. On the other hand, since the first light guide 27A and the second light guide 27B are connected to each other in the operation unit 18 in the present invention, the lengths of the first light guide 27A and the second light guide 27B are not extremely lengthened (for example, the length of one of the first light guide 27A and the second light guide 27B can be set to 0.5 m, and the length of the other thereof can be set to 3.0 m). Accordingly, the ease of assembly of the endoscope 12 is improved.

An endoscope to be used as a laparoscope has been described in the above-mentioned embodiment by way of example, but the present invention can also be applied to, for example, endoscopes used for other uses, such as an industrial use, and the like. Further, the endoscope comprises two light guides as the light guide part in the above-mentioned embodiment, but may comprise three or more light guides.

EXPLANATION OF REFERENCES

10: endoscope system
12: endoscope
13: light source device
14: processor device
15: monitor
16: user interface
17: insertion unit
17A: distal end portion
18: operation unit
19: universal cable
21: switch-disposition member
21A: operation switch
22: endoscope-side connector
22A: light guide rod
25: image pickup unit
26: image pickup sensor
27: light guide
27A: first light guide
27B: second light guide
27C: lens member
28: signal cable
28A: first signal cable
28B: second signal cable
29: emission end
31: light source unit
31a: V-LED
31b: B-LED
31c: G-LED
31d: R-LED
32: light source controller
33: wireless communication unit
33A: image signal receiving part
34: wireless power supply unit
35: signal transmission unit
36: light source device-side connector
36C: connection hole
36A, 36B: locking portion 37: incident end
38: wireless communication unit
38A: image signal transmission part
39: wireless power receiving unit
40: outer pipe
41: insertion passage
42: protection sheath
44: inner sheath
50: distal end optical system
52: distal end portion body
54: distal end lens barrel
55: tubular portion
56: cover glass
58a: objective lens
58b: prism
58c: lens
60: proximal end optical system
62: proximal end lens barrel
64: holder
65: prism
66: lens
67: circuit board
68: connector
70: rotational moving operation member
71: connecting member
72: operation unit body
73: seal member
74: housing
74a: partition wall
74b: tubular portion
76: fixing member
76A: through-hole
80: sealed space
82: air-tight connector
84: connecting unit
90: first connection member
92: first bearing receiving member
94: first bearing
96: second bearing receiving member
98: second bearing
100: second connection member
100A: connection piece
102: magnet coupling
103: first magnet
104: second magnet
110: connection unit
111: holding member
111A: cylindrical portion
111B, 111C: protruding portion
112: first ferrule
113: second ferrule
114: lens holder
Ax: insertion axis
OA: optical axis

What is claimed is:

1. An endoscope configured to be connected to a light source assembly emitting an illumination light in which a plurality of color lights are mixed by a plurality of light emitting diodes (LEDs) emitting color lights different from each other, the endoscope comprising:
an insertion section that is to be inserted into an object to be examined;
an operation unit that is connected to the insertion section;
an illumination light-emission end that is provided at a distal end portion of the insertion section;
a light guide part that guides illumination light and that includes a plurality of light guides guiding the illumination light emitted from the plurality of LEDs to the illumination light-emission end, and an optical lens suppressing a variation in a relative intensity of each color light of the illumination light, which is guided by the plurality of light guides and is emitted from the illumination light-emission end, with respect to a light distribution angle; and
an optical connector that optically connects the planarity of light guides by holding the plurality of light guides and the optical lens,
wherein the optical lens is disposed between the plurality of light guides, and
the optical connector and the optical lens are provided in the operation unit,
wherein the insertion section includes a protection sheath and a shaft member inserted into the protection sheath,
the operation unit includes an operation unit body connected to a proximal end side of the shaft member,
the optical connector is fixed to the protection sheath, and
portions of the plurality of light guides held by the optical connector are rotationally moved in a direction around an axis of the insertion section together with the protection sheath.

2. The endoscope according to claim 1,
wherein the insertion section includes an outer pipe forming an outer peripheral wall,
the protection sheath is inserted into the outer pipe, and
the plurality of light guides are inserted between the outer pipe and the protection sheath.

3. The endoscope according to claim 1,
wherein the operation unit includes a rotational moving operation member supported by the operation unit body to be rotationally movable, and
the protection sheath and the plurality of light guides are rotationally moved in a same direction as the rotational moving operation member by the rotation of the rotational moving operation member.

4. The endoscope according to claim 3, further comprising:
a signal cable that transmits and receives a signal,
wherein the signal cable is inserted into the shaft member, and
the plurality of light guides, when rotated together with the protection sheath, are positioned radially outward of the signal cable.

5. The endoscope according to claim 1, further comprising:
a holder that holds the plurality of light guides, the optical element, and the optical connector and that is fixed to the protection sheath.

6. The endoscope according to claim 5,
wherein the holder is formed in a tubular shape, and
the plurality of light guides, the optical element, and the optical connector are held on an outer peripheral surface side of the holder.

7. The endoscope according to claim 6,
wherein the optical connector and the holder are disposed in the operation unit body.

8. The endoscope according to claim 1, further comprising:
a housing that is provided in the operation unit and that is connected to the protection sheath; and
a magnetic coupler that magnetically connects the shaft member to the operation unit body,
wherein the protection sheath and the housing form an air-tight space, the housing includes a partition wall closing a proximal end opening of the housing, and the magnetic coupler magnetically connects the shaft member to the operation unit body with the partition wall interposed therebetween.

9. The endoscope according to claim 1, wherein the optical element is a lens member that, in a case where a relative intensity of one color light among the plurality of color lights emitted from the plurality of light sources is used as a reference, adjusts the relative intensities of other color lights such that their difference from that of the one color light used as the reference is ±5% or less.

10. An endoscope system comprising:

the endoscope according to claim 1; and the light-source assembly that emits the illumination light in which the plurality of color lights are mixed by the plurality of light sources emitting the color lights different from each other.

* * * * *